United States Patent

Sakanashi et al.

[11] Patent Number: 5,935,191
[45] Date of Patent: Aug. 10, 1999

[54] NAVIGATION APPARATUS FOR A VEHICLE

[75] Inventors: Kenji Sakanashi; Tetsuya Matsuoka, both of Fukuoka; Kouta Okada; Takayoshi Murahashi, both of Kasuga; Keiichi Zenmyo, Nakagawa-machi; Taro Ura, Kasuga; Kenichi Nakano, Fukuoka; Kazuhiko Ikeda, Dazaifu, all of Japan

[73] Assignee: Matsushita Electric Industrial Co., Ltd., Osaka, Japan

[21] Appl. No.: 08/553,153

[22] Filed: Nov. 7, 1995

[30] Foreign Application Priority Data

| Nov. 8, 1994 | [JP] | Japan | 6-273588 |
| Nov. 18, 1994 | [JP] | Japan | 6-285010 |
| Nov. 18, 1994 | [JP] | Japan | 6-285011 |
| Dec. 6, 1994 | [JP] | Japan | 6-302020 |
| Jul. 21, 1995 | [JP] | Japan | 7-185226 |

[51] Int. Cl.⁶ .................................................. G06F 17/00
[52] U.S. Cl. ........................ 701/207; 73/504.3; 701/217; 702/87; 702/94
[58] Field of Search .................................. 701/200, 205, 701/207, 208, 210, 217, 220, 221; 340/988, 995; 702/41, 82, 85, 87, 94, 141, 147, 150, 151, 154, 179; 73/488, 489, 495, 504.3, 509, 510, 514.1

[56] References Cited

U.S. PATENT DOCUMENTS

| 4,003,241 | 1/1977 | Thomas | 73/9 |
| 4,166,406 | 9/1979 | Maughmer | 701/221 X |
| 4,758,959 | 7/1988 | Thoone et al. | 701/221 |
| 5,058,023 | 10/1991 | Kozikaro | 701/217 |

Primary Examiner—William A. Cuchlinski, Jr.
Assistant Examiner—Ed Pipala
Attorney, Agent, or Firm—Ratner & Prestia

[57] ABSTRACT

The present invention relates to a navigation sppratus for finding a vehicle location by calculating on the basis of an output data of an acceleration detecting means for detecting a vehicle acceleration.

The navigation apparatus provides at least one acceleration detecting means for detecting a vehicle acceleration and stop judge means for judging a vehicle stopping state from the output variation of the acceleration detecting means.

4 Claims, 25 Drawing Sheets

NAVIGATION APPARATUS FOR A VEHICLE

BACKGROUND OF THE INVENTION

The present invention relates to a navigation apparatus to find a location of the vehicle.

FIG. 24 is a schematic representation of a navigation apparatus in accordance with the prior art. The block 1 is a vehicle such as a car. The block 2 is a gyro sensor to measure an angular velocity of vehicle 1. The block 3 is an engine control unit (ECU) to control an engine of vehicle 1. The block 4 is a computing unit to calculate the present location of vehicle 1 by a signal outputted from gyro sensor 2 and ECU 3.

Gyro sensor 2 is a sensor to output a value corresponding to an angular velocity (rotational angle per unit time) of the rotational motion of the wheel at the detecting direction as a voltage. There are a top type rate gyro sensor, an optical fiber gyro sensor and the like, according to detection type. These are briefly explained below.

FIG. 25 illustrates a construction of a top type rate gyro sensor. A rotor 5 rotating at a constant speed in a rotary direction 5a is supported by a gimbal 6. Gimbal 6 is supported by a spring 7 and a pick off detector 8. When a torque in a rotary direction 5a is generated at an input axis 9 of a top type rate gyro sensor, a torque is generated by a gyro effect at an output axis 10 which is orthogonal with input axis 9 and the torque is detected by pick off detector 8.

FIG. 26 illustrates a construction of an optical fiber gyro sensor. Light emitted from a laser 11 passes through fiber couplers 12 and 13 and is led in an optical fiber 14. Optical fiber 14 is several hundred meters long and is wound with a diameter of several ten millimeters. The light passing through optical fiber 14 passes through a phase modulator 15, passes through fiber couplers 12 and 13 again and is led to an optical detector 16. In an optical fiber gyro sensor thus constructed, when a torque 17 is generated around the input axis orthogonal with a winding plane of optical fiber 14, light is outputted to optical detector 16 by Sagnac effect as a variation of an optical interference.

A gyro sensor 2 for detecting an angular velocity of vehicle 1 is set in vehicle 1 so that an angular velocity around the vertical axis of vehicle 1 can be detected.

Engine control unit 3 processes information obtained from various kinds of sensors (for example, a sensor for detecting the number of rotation of the wheel) attached to vehicle 1 and controls various kinds of actions of vehicle 1. Engine control unit 3 outputs a pulse corresponding to the velocity of vehicle 1 to computing unit 4.

As shown in FIG. 27, the present location $(x_n, y_n)$ of vehicle 1 is obtained by cumulatively calculating a moving distance $\Delta D_n$ and a moving azimuth $\Delta \theta_n$ which vary at every period $\Delta t$ from the initial location $(x_0, y_0)$ at computing unit 4. The moving azimuth $\theta_n$ is obtained by integrating an angular velocity $\omega_n$ detected at gyro sensor 2 by time, where an initial azimuth at time n is defined $\theta_0$ and period to obtain data from gyro sensor 2 is defined $\Delta t$.

$$\theta_n = \theta_o + \sum_{i=1}^{n} \omega_i * \Delta t \qquad (\text{eq. 1})$$

Then, the moving distance $\Delta Dn$ of vehicle 1 is obtained by integrating a velocity $v_n$ of vehicle 1 obtained from a pulse generated at engine control unit 3, where the initial velocity is defined $v_0$.

$$\Delta D_n = v_o * t_{n-1} + \sum_{i=1}^{n} v_i * \Delta t \qquad (\text{eq. 2})$$

When computing unit 4 obtains the moving distance $\Delta D_n$ and the moving azimuth $\theta_n$ of vehicle 1 at time n, the present location of vehicle 1 $(x_n, y_n)$ is obtained by cumulative calculation from the initial location $(x_0, y_0)$, as shown in FIG. 27.

$$x_n = x_o + \sum_{i=1}^{n} \Delta D_i * \sin\theta_i \qquad (\text{eq. 3})$$

$$y_n = y_o + \sum_{i=1}^{n} \Delta D_i * \cos\theta_i \qquad (\text{eq. 3})$$

In the above construction, however, a velocity signal such as a pulse from engine control unit 3 of vehicle 1 is taken out to detect a moving distance of vehicle 1 and when a navigation apparatus is equiped after purchasing a vehicle, wiring work is required in vehicle 1. It is sometimes impossible to connect wires from a point of construction of the vehicle in some kinds of vehicles, as well as it requires much expense for the user. Moreover, there is a possibility to cause malfunction of engine control unit 3 at wiring work.

SUMMARY OF THE INVENTION

The present invention solves the above problems and aims to present a navigation apparatus which can obtain a location of the vehicle with a good accuracy without requiring wiring work in the vehicle.

The present invention relates to a navigation apparatus for finding a location of the vehicle and the navigation apparatus provides with a computing unit to calculate the vehicle location from the output data of the acceleration detecting means to detect a vehicle acceleration.

The navigation apparatus provides with at least one acceleration detection means to detect a vehicle acceleration and further provides with stop judge means to judge a stopping state of the vehicle from the output variation of the acceleration detection means.

BRIEF DESCRIPTION IF THE DRAWING

DETAILED DESCRIPTION OF THE INVENTION

First Exemplary Embodiment

A first exemplary embodiment of the present invention is explained below, referring to drawings.

Figure 1:
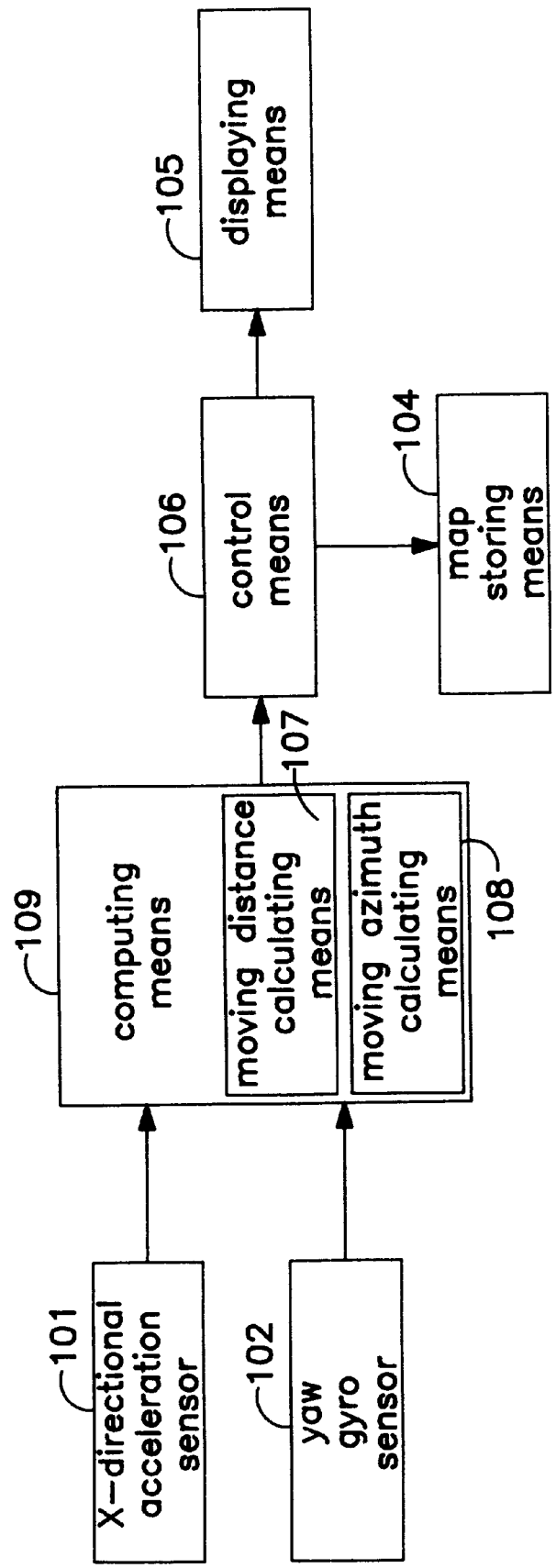
FIG. 1 is a block diagram of a navigation apparatus using an X-directional acceleration sensor and a yaw angular velocity sensor in accordance with a first exemplary embodiment of the present inventon.
Figure 2:
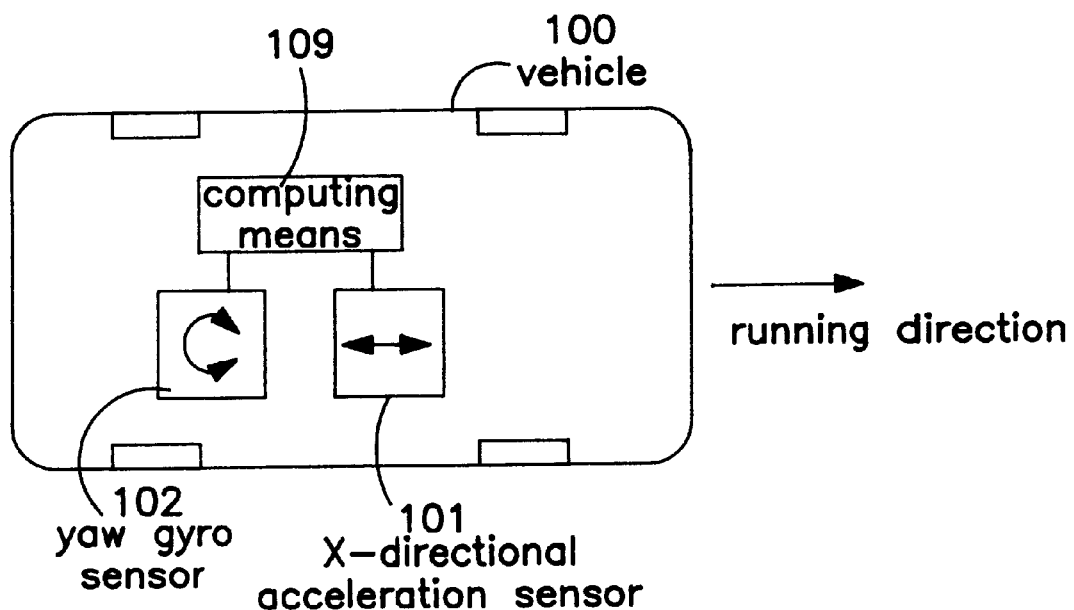
FIG. 2 is a schematic representation of a navigation apparatus shown in FIG. 1 mounted on a vehicle in accordance with the first exemplary embodiment of the present invention. (top plan view)

FIG. 1 is a block diagram of a navigation apparatus using an X-directional acceleration sensor and a yaw angular velocity sensor. FIG. 2 is a schematic representation of a navigation apparatus shown in FIG. 1 mounted on a vehicle (top plan view), both in accordance with the first exemplary embodiment of the present invention. In FIG. 2, the block 100 is a vehicle such as a car. In FIG. 1, the block 101 is an acceleration sensor for detecting an acceleration of vehicle 100. The block 102 is a gyro sensor for detecting an angular velocity of vehicle 100. The block 107 is moving distance calculating means for calculating a moving distance of vehicle 100 from the output data of acceleration sensor 101. The block 108 is moving azimuth calculating means for calculating a moving azimuth of vehicle 100 from the output data of gyro sensor 102. The block 109 is computing means for calculating a location of vehicle 100 from the calculated result of moving distance calculating means 107 and moving azimuth calculating means 108.

The block 104 is map storing means for storing digitalized map data in a storing medium such as a CD-ROM (Compact Disk Read Only Memory). The block 105 is displaying means providing with a picture display device such as an LCD (Liquid Crystal Display). The block 106 is control means for reading the map data of a designated area from map storing means 104 and displaying the map and the location of vehicle 100 on displaying means 105 when a location information of vehicle 100 is obtained from computing means 109.

As shown in FIG. 2, acceleration sensor 101 is attached in vehicle 100 to be able to detect an acceleration in a running direction (X axis direction in FIG. 3) of vehicle 100 and gyro sensor 102 is also attached in vehicle 100 to be able to detect an angular velocity around a perpendicular axis (Z axis direction in FIG. 3) of vehicle 100.

Figure 3:
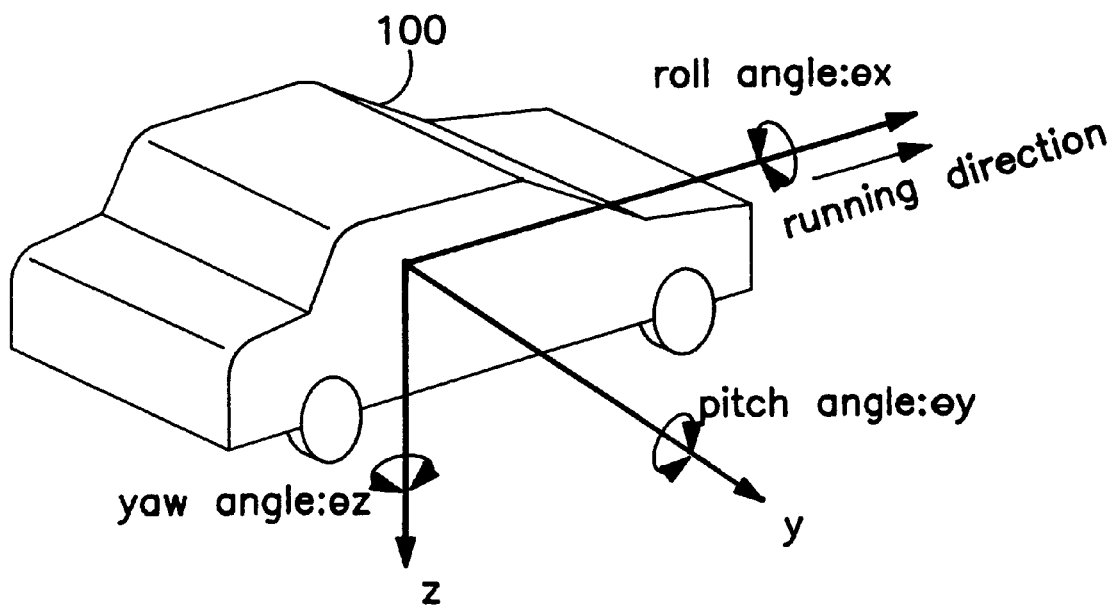
FIG. 3 illustrates coordinates of a vehicle for explaining functions of exemplary embodiments of the present invention.

FIG. 3 illustrates coordinates of a vehicle for explaining functions of exemplary embodiments of the present invention. As shown in FIG. 3, a running direction of vehicle 100 on a horizontal plane is defined as X axis, a perpendicular direction with the X coordinate axis on a horizontal plane is defined as Y coordinate axis and a gravity direction of the vehicle is defined as Z coordinate axis. In the following description, a motion of vehicle 100 around X axis is called rolling and an angle which vehicle 100 rotates by rolling is called roll angle $\theta_x$. Similarly, a motion of vehicle 100 around Y axis is called pitching and an angle which vehicle 100 rotates by pitching is called pitch angle $\theta_y$ and a motion of vehicle 100 around Z axis is called yaw and an angle which vehicle 100 rotates by yaw is called yaw angle $\theta_z$. Yaw angle $\theta_z$ expresses a variation of the running direction of vehicle 100 and is called moving azimuth $\theta_z$ as well.

About a navigation apparatus constructed as above, an action to obtain a location of vehicle 100 by computing means 109 from the output data of an X-directional acceleration sensor 101 and a gyro sensor 102 is explained below.

As shown in FIG. 1, the data outputted from X-directional acceleration sensor 101 and gyro sensor 102 is supplied to computing means 109 at every designated time $\Delta t$. The output data from X-directional acceleration sensor 101 and gyro sensor 102 are inputted to computing means 109 as digital data through an A/D (Analog to Digital) converter (not shown). Computing means 109 converts the output data of X-directional acceleration sensor 101 and the output data of gyro sensor 102 into acceleration $a_{xi}$ and angular velocity $\omega_{zi}$, respectively.

Obtaining acceleration $a_{xi}$, moving distance calculating means 107 calculates velocity $v_{xn}$ of vehicle 100 by eq. 5, where $v_{xn}$ is velocity at time n, $a_{xi}$ is acceleration, $\Delta t$ is period to pick up output data from acceleration sensor 101 and $v_{x0}$ is initial velocity.

$$v_{xn} = v_{xo} + \sum_{i=1}^{n} a_{xi} * \Delta t \qquad (eq. 5)$$

Obtaining velocity $v_{xn}$ of vehicle 100 at time $\Delta t$ from eq. 5, moving distance calculating means 107 calculates moving distance $D_i$ of vehicle 100 at time $\Delta t$ from eq. 6.

$$\Delta D_i = V_{xi-1} * \Delta t + 0.5 * a_{xi} * \Delta t^2. \qquad (eq.6)$$

Obtaining angular velocity $\omega_{zn}$, moving azimuth calculating means 108 calculates moving azimuth $\theta_{zi}$ of vehicle 100 at time $\Delta t$ from eq. 7.

$$\theta_{zi} = \theta_o + \sum_{i=1}^{n} \omega_{zi} * \Delta t \qquad (eq. 7)$$

Figure 27:
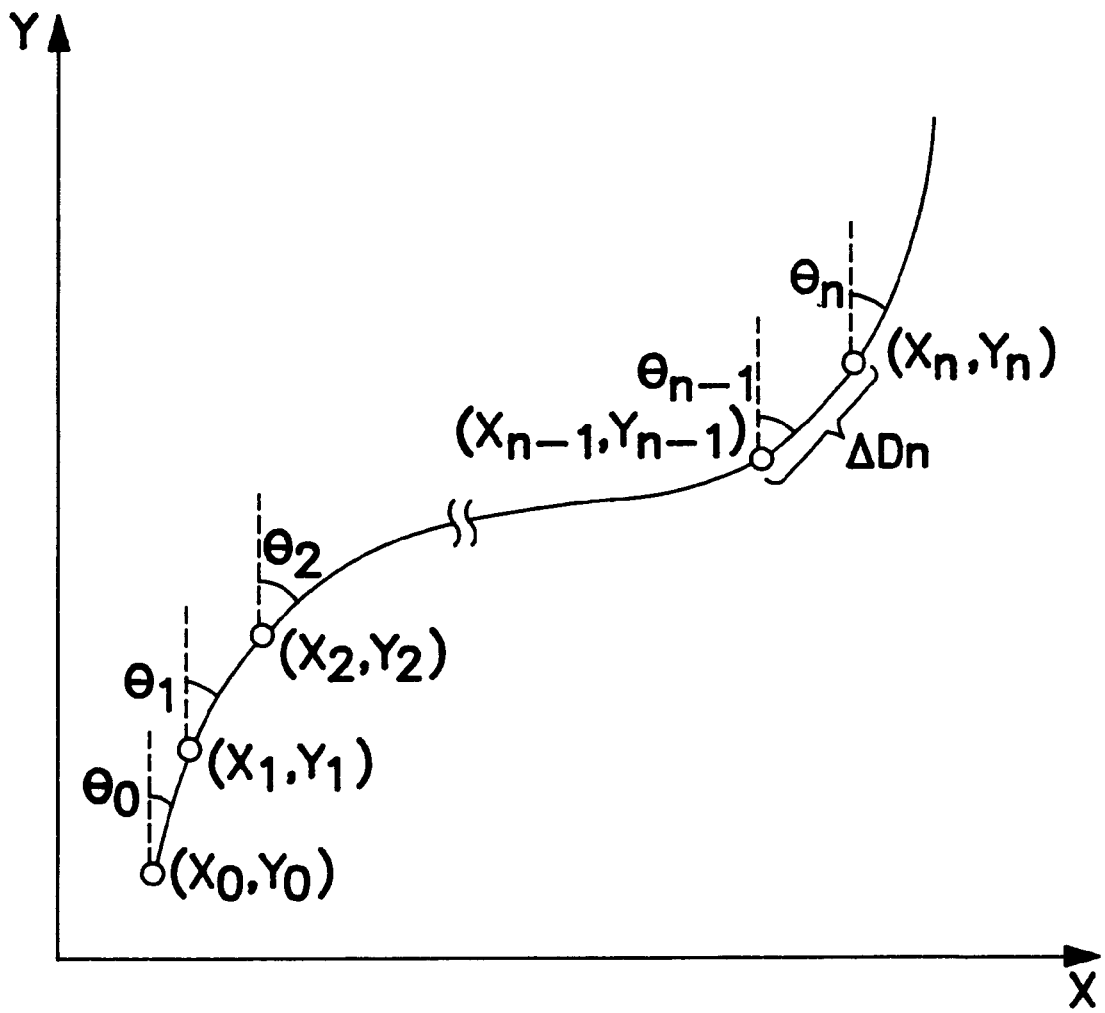
FIG. 27 illustrates how to calculate a location of the vehicle.

When computing means 109 obtains moving distance $\Delta D_i$ at time i and moving azimuth $\theta_{zi}$ at time i from moving distance calculating means 107 and moving azimuth calculating means 108, respectively, the location $(x_n, y_n)$ of vehicle 100 at time n is obtained by executing accumulative calculations shown in eq. 8 and eq. 9 from the initial location $(x_0, y_0)$, as shown in FIG. 27.

$$x_n = x_o + \sum_{i=1}^{n} \Delta D_i * \sin\theta_{zi} \qquad (eq. 8)$$

$$y_n = y_o + \sum_{i=1}^{n} \Delta D_i * \cos\theta_{zi} \qquad (eq. 9)$$

When the location $(x_n, y_n)$ of vehicle 100 is determined, control means 106 transforms the location of vehicle 100 calculated at computing means 109 to the coordinate systems on the map data in map storing means 104 if necessary, marks the location of vehicle 100 on the map data and outputs to displaying means 105.

Thus, in the first exemplary embodiment of the present invention, because the moving distance of vehicle 100 at designated time $\Delta t$ can be obtained from the output data of acceleration sensor 101, it is possible to obtain the location of vehicle 100 without receiving a signal from vehicle 100 like the prior art and to realize a navigation apparatus which does not require wiring work.

In the above explanation, although the moving azimuth of vehicle 100 is obtained from the output data of gyro sensor 102, it can be obtained from an acceleration sensor instead of gyro sensor 102, as described below.

Figure 4:
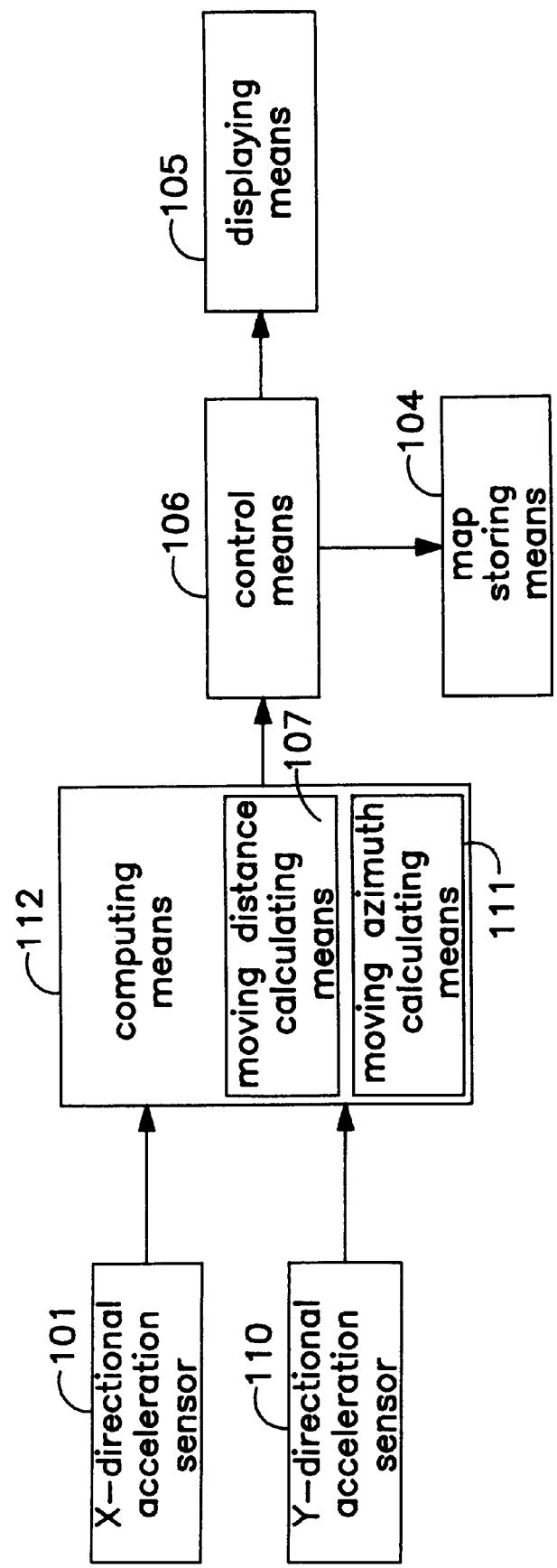
FIG. 4 is a block diagram of a navigation apparatus using an X-directional acceleration sensor and a Y-directional acceleration sensor in accordance with the first exemplary embodiment of the present invention.

FIG. 4 is a block diagram of a navigation apparatus using an X-directional acceleration sensor and a Y-direction accelerational sensor in accordance with a first exemplary embodiment of the present invention. In FIG. 4, the block 110 is a Y-directional acceleration sensor for detecting a Y-directional acceleration and detects an acceleration of a different direction from that of X-directional acceleration sensor 101. The block 111 is a moving azimuth calculating means for calculating a moving azimuth of vehicle 100 from the output data of Y-directional acceleration sensor. The block 112 is a computing means for calculating a location of vehicle 100 from the calculated results at moving distance calculating means 107 and moving azimuth calculating means 111. The blocks having similar functions to these in FIG. 1 are numbered with the same reference numbers.

Figure 5:
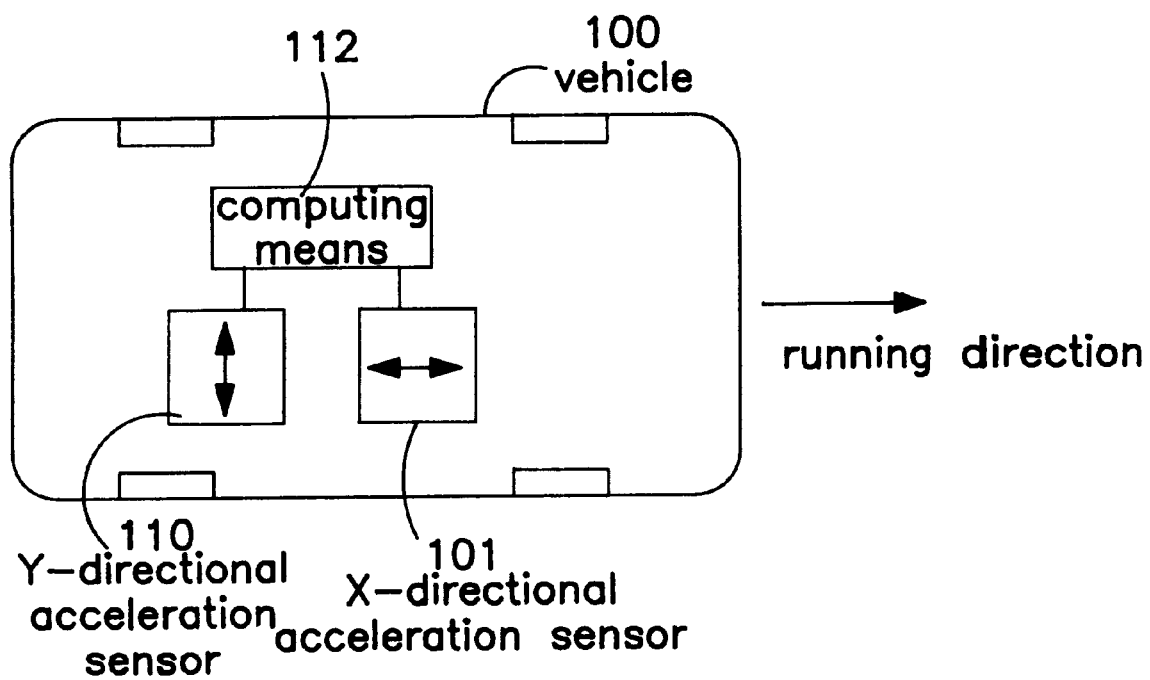
FIG. 5 is a schematic representation of a navigation apparatus shown in FIG. 4 in accordance with the first exemplary embodiment of the present invention. (top plan view)

FIG. 5 is a schematic representation (top plan view) of a navigation apparatus shown in FIG. 4 in accordance with the first exemplary embodiment of the present invention. As shown in FIG. 5, an X-directional acceleration sensor 101 is attached to vehicle 100 so as to be able to detect an acceleration in the running direction (X direction in FIG. 3) of vehicle 100. A Y-directional acceleration sensor 110 is attached to vehicle 100 so as to be able to detect an acceleration in the perpendicular direction (Y-direction in FIG. 3) to the running direction of vehicle 100 in a horizontal plane.

About a navigation apparatus constructed as above, an action to obtain a location of vehicle 100 at computing means 112 from the output data of X-directional acceleration sensor 101 and Y-directional acceleration sensor 110 is explained below.

Data from X-directional acceleration sensor 101 and Y-directional acceleration sensor 110 is inputted to computing means 112 at every designated time $\Delta t$. Computing means 112 transforms the output data from X-directional acceleration sensor 101 and Y-directional acceleration sensor 110 into X-directional acceleration axn and Y-directional acceleration ayn, respectively. As previously described, moving distance calculating means 107 calculates a velocity vxn of vehicle 100 at time n from the output data of X-directional acceleration sensor 101 by eq. 5 and further calculates moving distance $\Delta D_n$ at time $\Delta t$ by eq. 6.

Moving azimuth calculating means 111 calculates moving azimuth $\theta_{zn}$ from the output data of Y-directional acceleration sensor 110 as follows. Regarding the horizontal motion (Y direction in FIG. 3) of vehicle 100 as a rotation motion, there is a following relationship indicated by eq. 10 between a centrifugal force and an angular velocity $\omega_{zn}$ of vehicle 100, where $a_{yn}$ is defined as an acceleration transformed from the output data of Y-directional acceleration sensor 110 at time n, $\omega_{zn}$ is defined as an angular velocity at time n, $r_n$ is defined as a radius of a rotation motion of vehicle 100 and m is defined as a mass of vehicle 100.

$$m*r_n*\omega_{zn}^2 = m*a_{yn} \qquad (eq.10)$$

There is a following relationship between an angular velocity $\omega_{zn}$ and an X-directional velocity $v_{zn}$ of vehicle 100.

$$r_n{}^*\omega_{zn}=v_{xn} \qquad (eq.11)$$

Eq. 12 is derived from eqs. 10 and 11. Here, because Y-directional acceleration $a_{yn}$ is known from the output data of Y-directional acceleration sensor 110 and X-directional velocity $v_{xn}$ is also known, angular velocity $\omega_{zn}$ of vehicle 100 can be calculated at moving azimuth calculating means 111.

$$\omega_{zn}=a_{yn}/v_{xn} \qquad (eq.12)$$

Obtaining angular velocity $\omega_{zn}$ from eq. 12, moving azimuth calculating means 111 calculates a moving azimuth $\theta_{zn}$ of vehicle 100 at time n from eq. 7.

Calculating moving distance $\Delta D_n$ and moving azimuth $\theta_{zn}$ at time n at moving distance calculating means 107 and moving azimuth calculating means 111, respectively, computing means 112 calculates the location $(x_n, y_n)$ of vehicle 100 at time n by using eqs. 8 and 9 which are accumulative calculation from the initial location $(x_0, y_0)$ of vehicle 100, as shown in FIG. 27.

Thus, a moving azimuth can be obtained also by using a Y-directional acceleration sensor 110 and a navigation apparatus without requiring wiring work can be realized.

According to the first exemplary embodiment of the present invention, a moving distance of vehicle 100 can be obtained by providing an X-directional acceleration sensor 101 for detecting a moving distance of vehicle 100 and double integrating the output data from the acceleration sensor 101. As a result, a navigation apparatus is realized which is unnecessary for wiring in vehicle 100 and is easy to attach and detach.

Second Exemplary Embodiment

A second exemplary embodiment of the present invention is explained below, referring to drawings.

Figure 6:
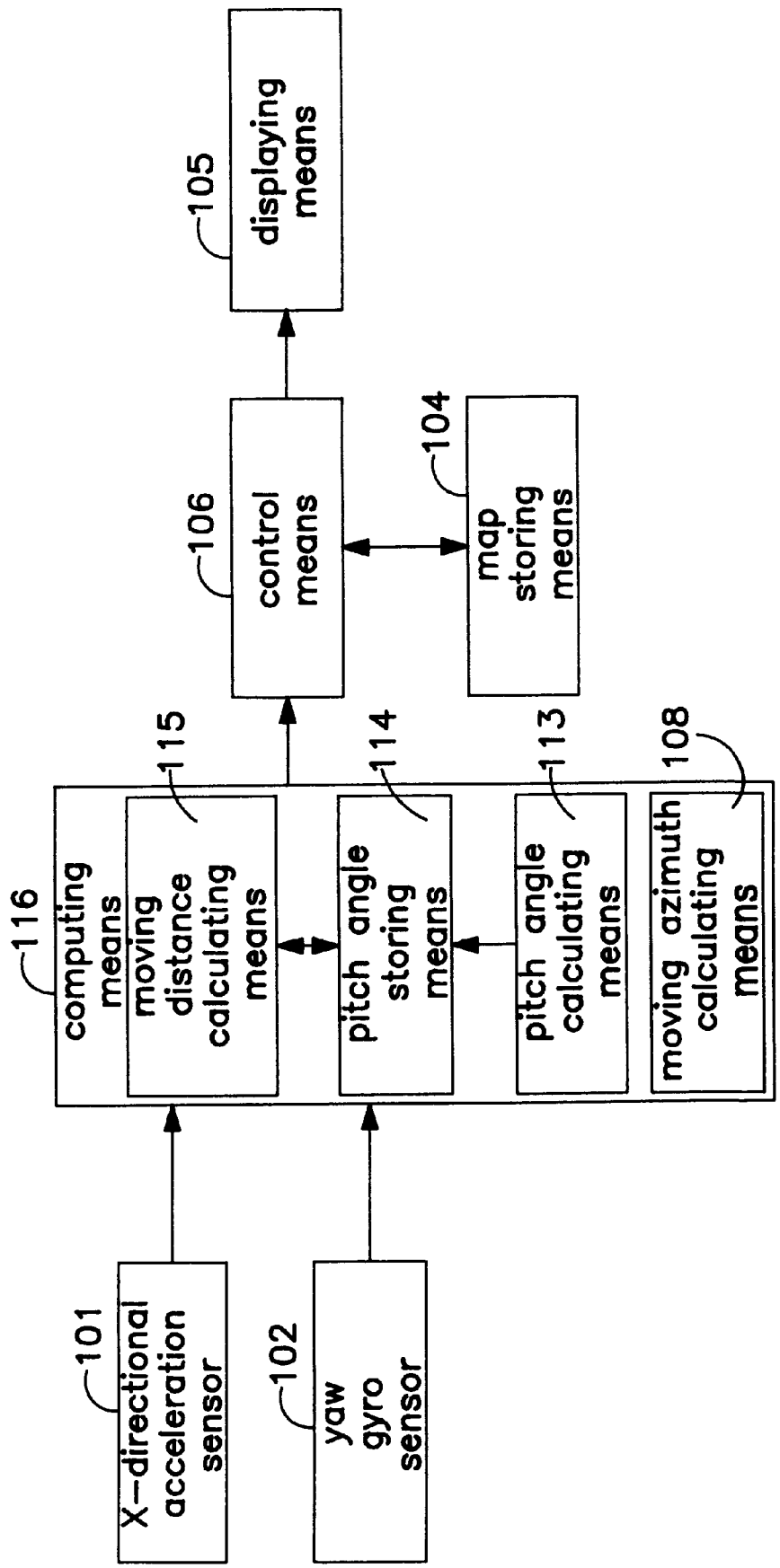
FIG. 6 is a block diagram of a navigation apparatus using an X-directional acceleration sensor and a yaw angular velocity sensor in accordance with a second exemplary embodiment of the present invention.

FIG. 6 is a block diagram of a navigation apparatus using an X-directional acceleration sensor and a yaw angular velocity sensor in accordance with the second exemplary embodiment of the present invention. In FIG. 6, the block 113 is pitch angle calculating means for calculating an angle (pitch angle, hereafter) slanting to a pitching direction of vehicle 100. The block 114 is pitch angle storing means for temporarily storing a pitch angle calculated at pitch angle calculating means 113. The block 115 is moving distance calculating means for calculating a moving distance of vehicle 100 from the output data of X-dorectional acceleration sensor 101 and the pitch angle data stored in pitch angle storing means 114. The block 116 is computing means for calculating the location of vehicle 100 from the output data of moving distance calculating means 115 and moving azimuth calculating means 108. The blocks having similar functions to those in FIG. 1 are numbered with the same reference numbers.

Figure 7:
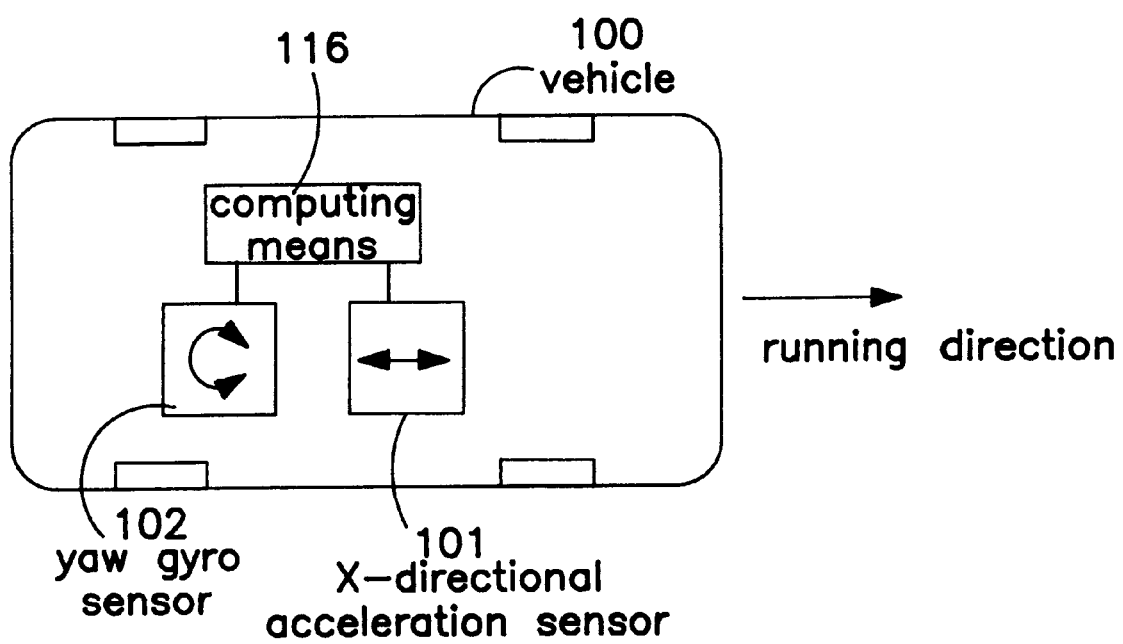
FIG. 7 is a schematic representation of a navigation apparatus shown in FIG. 6 mounted on a vehicle in accordance with the second exemplary embodiment of the present invention. (top plan view)

FIG. 7 is a schematic representation (top plan view) of a navigation apparatus shown in FIG. 6 mounted on a vehicle in accordance with the second exemplary embodiment of the present invention. As shown in FIG. 7, an X-directional acceleration sensor 101 is attatched to veihicle 100 so as to be able to detect an acceleration in the running direction (X direction in FIG. 3) of vehicle 100. A gyro sensor 102 is also attatched to vehicle 100 so as to be able to detect an angular velocity in the yaw direction (around Z axis in FIG. 3) of vehicle 100.

Figure 8:
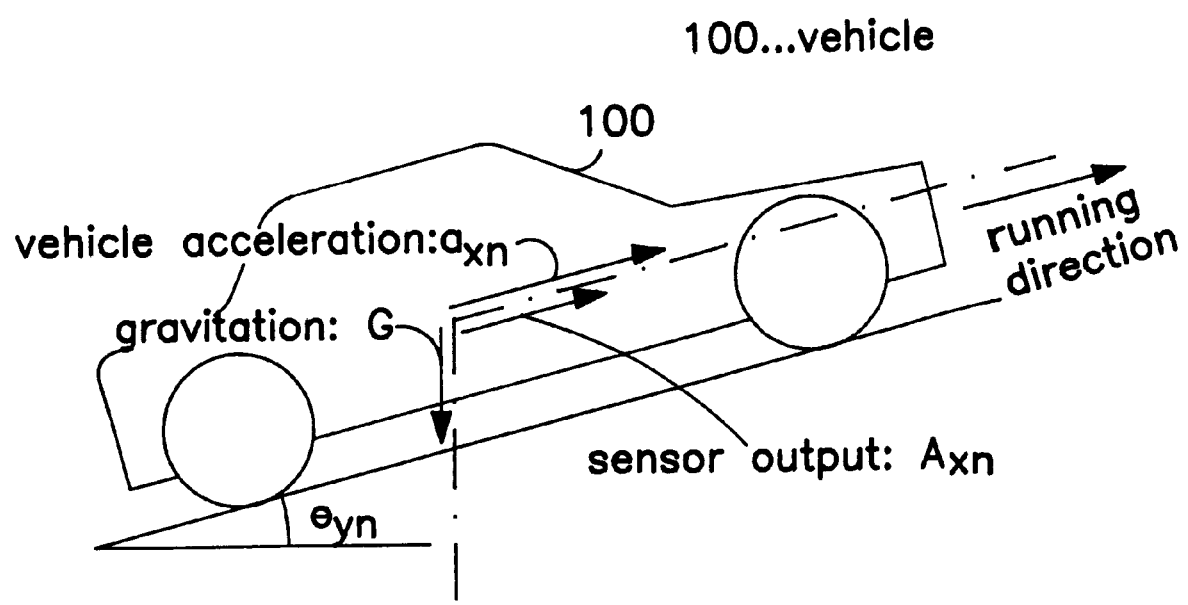
FIG. 8 illustrates a vehicle running on a slope in accordance with the second exemplary embodiment of the present invention. (side view)

FIG. 8 illustrates a vehicle running on a slope in accordance with the second exemplary embodiment of the present invention. (side view) As shown in FIG. 8, in the first exemplary embodiment, X-directional acceleration sensor 101 to detect an acceleration in the running direction of vehicle 100 is used to obtain a moving distance of vehicle 100. Although there is no problem when vehicle 100 is running on a horizontal plane, when vehicle 100 is running on a slope, if vehicle 100 has a pitch angle $\theta_{yn}$, X-directional acceleration sensor 101 detects a running directional component $G^* \sin \theta_{yn}$ of the acceleration of gravity G and the acceleration Axn detected by X-directional acceleration sensor 101 indicates a different value from the actual acceleration axn in the running direction of vehicle 100. This is a problem.

According to the second exemplary embodiment of the present invention, an output error of X-directional acceleration sensor 101 generated in the case in which vehicle 100 has a pitch angle $\theta_{yn}$, for example, at running on a slanting road is compensated and a moving distance $\Diamond$ DO of vehicle 100 is obtained with a good accuracy.

As shown in FIG. 8, the actual acceleration axn of vehicle 100 is obtained from eq. 13, where $a_{xn}$ is the actual acceleration of vehicle 100 at time n, $A_{xn}$ is the acceleration detected at vehicle 100 at time n, G is the acceleration of gravity of the globe and $\theta_{yn}$ is the pitch angle of vehicle 100 at time n.

$$a_{xn}=A_{xn}+G^* \sin \theta_{yn} \qquad (eq.13)$$

The above equation means that when pitch angle $\theta_{yn}$ is obtained, actual acceleration $a_{yn}$ of vehicle 100 can be obtained, that is the output data of X-directional acceleration sensor 101 can be compensated. Assuming vehicle 100 stops or is running with a constant speed, the actual acceleration $a_{xn}$ of vehicle 100 is zero in this state. Therefore, eq. 13 can be transformed into eq. 14 and further into eq. 15.

$$A_{xn}=-G^* \sin \theta_{yn} \qquad (eq.14)$$

$$\theta_{yn}=\arcsin (-A_{xn}/G) \qquad (eq.15)$$

X-directional acceleration sensor 101 outputs data to computing means 116 at every designated time $\Delta t$. Computing means 116 transforms the outputs of X-directional acceleration sensor 101 and gyro sensor 102 into X-directional acceleration $A_{xn}$ and yaw angular velocity $\omega_{yn}$, respectively. Pitch angle calculating means 113 calculates pitch angle $\theta_{yn}$ of vehicle 100 at time n from eq. 15, when it judges that vehicle 100 stops or is running with a constant speed. The calculated pitch angle $\theta_{yn}$ is stored in pitch angle storing means 114.

Obtaining X-directional acceleration $A_{xn}$ from the output data of X-directional acceleration sensor 101, moving distance calculating means 115 reads pitch angle $\theta_{yn}$ from pitch angle storing means 114 and the actual acceleration $a_{xn}$ of vehicle 100 is calculated from eq. 13. Obtaining acceleration $a_{xn}$, moving distance $\Delta Dn$ at designated time $\Delta t$ is calculated from eq. 6 like in the first exemplary embodiment.

Moving azimuth $\theta_{zn}$ at time n and designated time $\Delta t$ is calculated from the output data of gyro sensor 102 using eq. 7 at moving azimuth calculating means 108 also like in the first exemplary embodiment.

Obtaining moving distance $\Diamond$ Dn and moving azimuth $\theta zn$ from mbving distance calculating means 115 and moving azimuth calculating means 108, computing means 116 calculates the location of vehicle 100 $(x_n, y_n)$ at time n by accumulative calculations eqs. 8 and 9 from the initial location $(x_0, y_0)$ as shown in FIG. 27.

As a judge reference of pitch angle calculating means 110, if vehicle 100 is in a stop state or is running with a constant speed, for example, it is considered that the data outputted from X-directional acceleration sensor 101 does not vary during a designated period.

In the configuration shown in FIG. 6, a Y-directional acceleration sensor 110 shown in FIG. 4 can naturally be used instead of a yaw gyro sensor 102.

Thus, in the second exemplary embodiment of the present invention, an accurate moving distance of vehicle 100 can be obtained even if X-directional acceleration sensor is influenced by the acceleration of gravity, by detecting a pitch angle when vehicle 100 is in a stopping state or in a running state with a constant speed and compensating the output data of X-directional acceleration sensor 101 using the pitch angle obtained above.

Third Exemplary Embodiment

Figure 9:
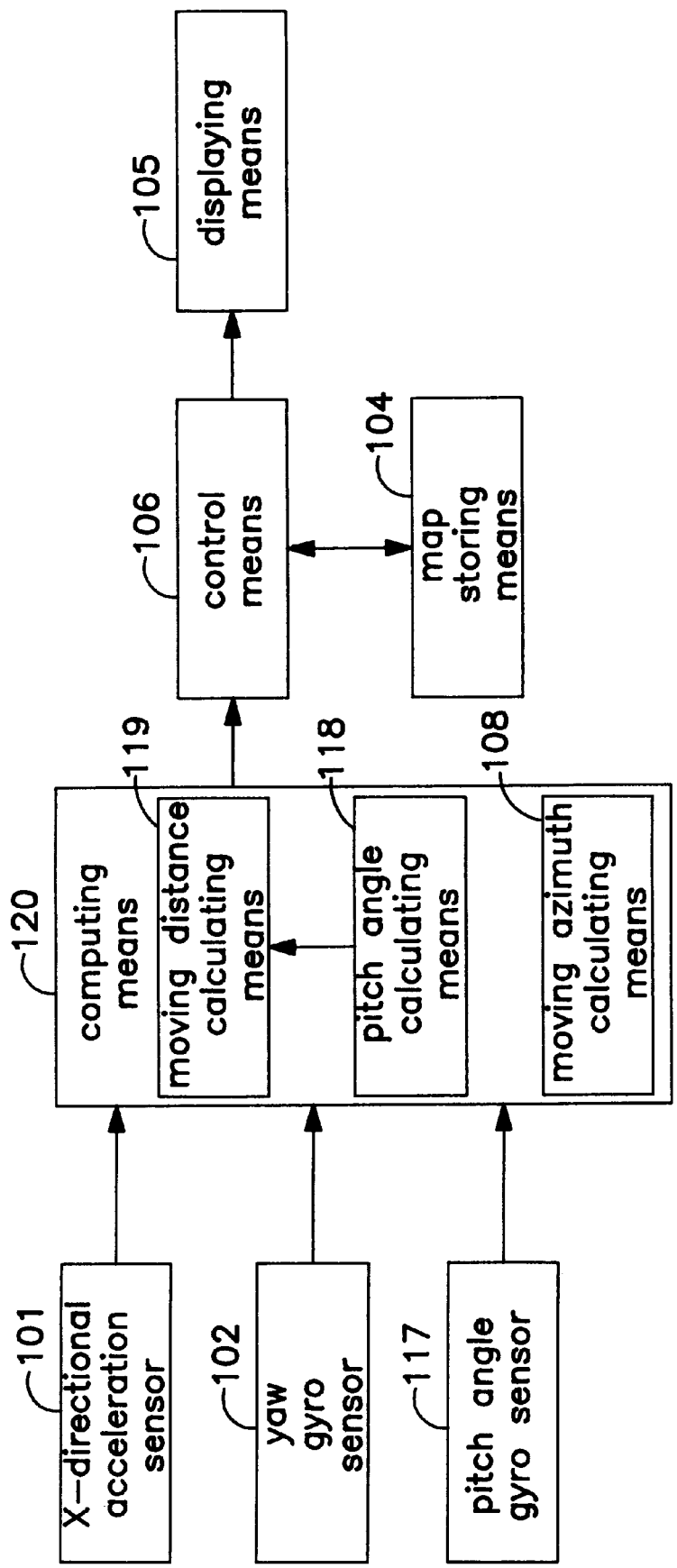
FIG. 9 is a block diagram of a navigation apparatus using an X-directional acceleration sensor, a yaw angular velocity sensor and a pitch angular velocity sensor in accordance with a third exemplary embodiment of the present invention.

A third exemplary embodiment of the present invention is explained below, referring to the drawings. FIG. 9 is a block diagram of a navigation apparatus using an X-directional acceleration sensor, a yaw angular velocity sensor and a pitch angular velocity sensor in accordance with a third exemplary embodiment of the present invention. The block 117 is a gyro sensor to detect a pitch angular velocity of vehicle 100. The block 118 is pitch angle calculating means to calculate a pitch angle of vehicle 100 from the output data of gyro sensor 117. The block 119 is moving distance calculating means to calculate a moving distance of vehicle 100 from the output data of X-directional acceleration sensor 101 and pitch angle calculating means 118. The block 120 is computing means for obtaining a location of vehicle 100 from the output of moving distance calculating means 119 and moving azimuth calculating means 108. The blocks having similar functions to those in FIG. 1 are numbered with the same reference numbers.

Figure 10:
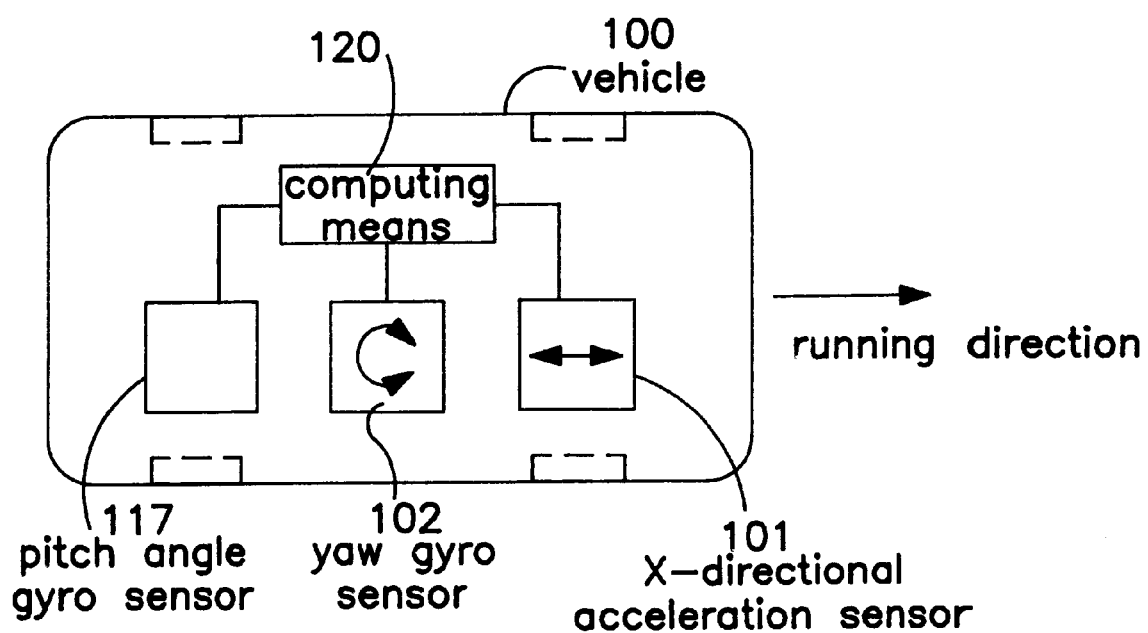
FIG. 10 is a schematic representation of a navigation apparatus shown in FIG. 9 mounted on a vehicle in accordance with the third exemplary embodiment of the present invention. (top plan view)
Figure 11:
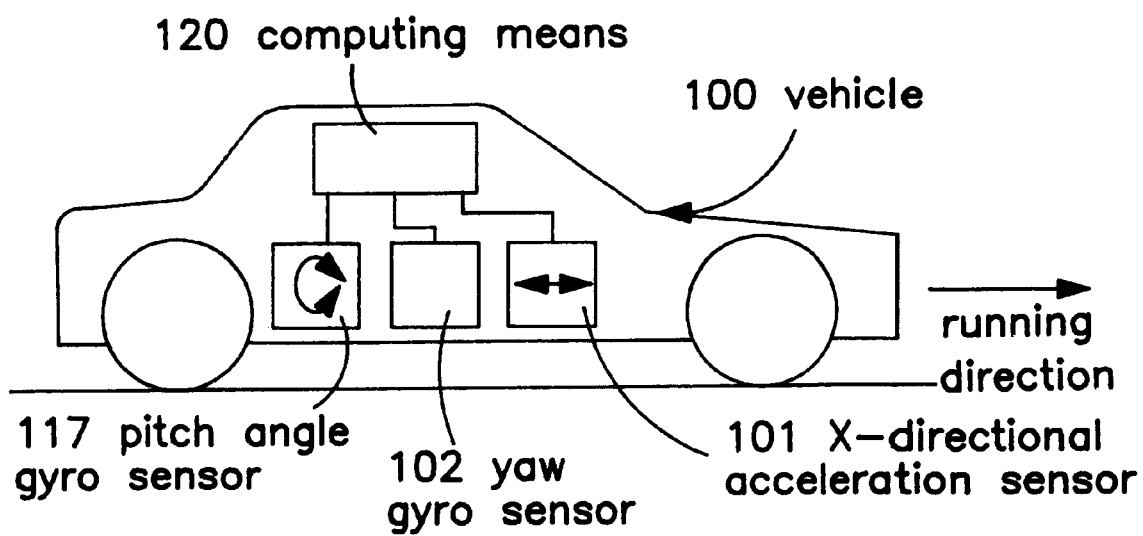
FIG. 11 is a schematic representation of a navigation apparatus shown in FIG. 9 mounted on a vehicle in accordance with the third exemplary embodiment of the present invention. (side view)

FIGS. 10 and 11 are schematic representations of a navigation apparatus shown in FIG. 9 mounted on a vehicle in accordance with the third exemplary embodiment of the present invention and FIG. 10 is its top plan view and FIG. 11 is its side view. As shown in FIGS. 10 and 11, an X-directional acceleration sensor 101, a yaw gyro sensor 102 and a pitch gyro sensor 117 are attached to vehicle 100 so as to be able to detect an acceleration in the running direction of vehicle 100 (X-direction in FIG. 3), an angular velocity of yaw motion of vehicle 100 (around Z-axis in FIG. 3) and an angular velocity of pitch motion of vehicle 100 (around Y axis in FIG. 3), respectively.

The different point of the third exemplary embodiment from the second exemplary embodiment is that while in the second exemplary embodiment, it is difficult to get an accurate pitch angle when the road slope is steep because the pitch angle of vehicle 100 is obtained at a stop state or a constant running speed state, in the third exemplary embodiment, it is possible to obtain a pitch angle at every designated period independent of the running state of vehicle 100.

As shown in FIG. 9, X-directional acceleration sensor 101, yaw angle gyro sensor 102 and pitch angle gyro sensor 117 output the data to computing means 120 at every designated period $\lozenge t$. Computing means 120 transforms the output data from X-directional acceleration sensor 101, yaw angle gyro sensor 102 and pitch angle gyro sensor 117 into an X-directional acceleration axn, yaw angular velocity wzn and pitch anglular velocity $\omega_{yn}$, respectively. Obtaining pitch angular velocity $\omega_{yn}$ at time n, pitch angle calculating means 118 calculates a pitch angle $\theta_{yn}$ by eq. 16, where $\theta_{yn}$ is an initial angle of vehicle 100 in pitching direction.

$$\theta_{yn} = \theta_{yo} + \sum_{i=1}^{n} \omega_{yi} * \Delta t \qquad (\text{eq. 16})$$

Moving distance calculating means 119 compensates an acceleration $A_{xn}$ detected at X-directional acceleration sensor 101 by eq. 13, using pitch angle $\theta_{yn}$ and obtains actual X-directional acceleration $a_{xn}$ of vehicle 100. Obtaining X-directional acceleration $a_{xn}$, moving distance calculating means 119 calculates moving distance $\Delta Dn$ of vehicle 100 at time n from eqs. 5 and 6, similarly to the first exemplary embodiment.

Moving azimuth calculating means 108 calculates moving azimuth $\theta_{zn}$ from the output data of yaw angle gyro sensor 102.

Obtaining moving distance $\Delta Dn$ and moving azimuth $\theta_{zn}$ at time n from moving distance calculating means 119 and moving azimuth calculating means 108, respectively, computing means 120 calculates the location $(x_n, y_n)$ of vehicle 100 at time n by accumulative calculations of eqs. 8 and 9 from the initial location $(x_0, y_0)$ as shown in FIG. 27.

Although pitch angle $\theta_{yn}$ of vehicle 100 is calculated from the output data of pitch angle gyro sensor 117 to detect pitch angular velocity wyn of vehicle 100 in the above explanation, it is possible to calculate pitch angle $\theta_{yn}$ using Z-directional acceleration sensor 121 (shown in FIG. 12) to detect Z-directional acceleration $a_{zn}$ in the perpendicular direction of vehicle 100 (Z-direction in FIG. 3). This is explained below.

Figure 12:
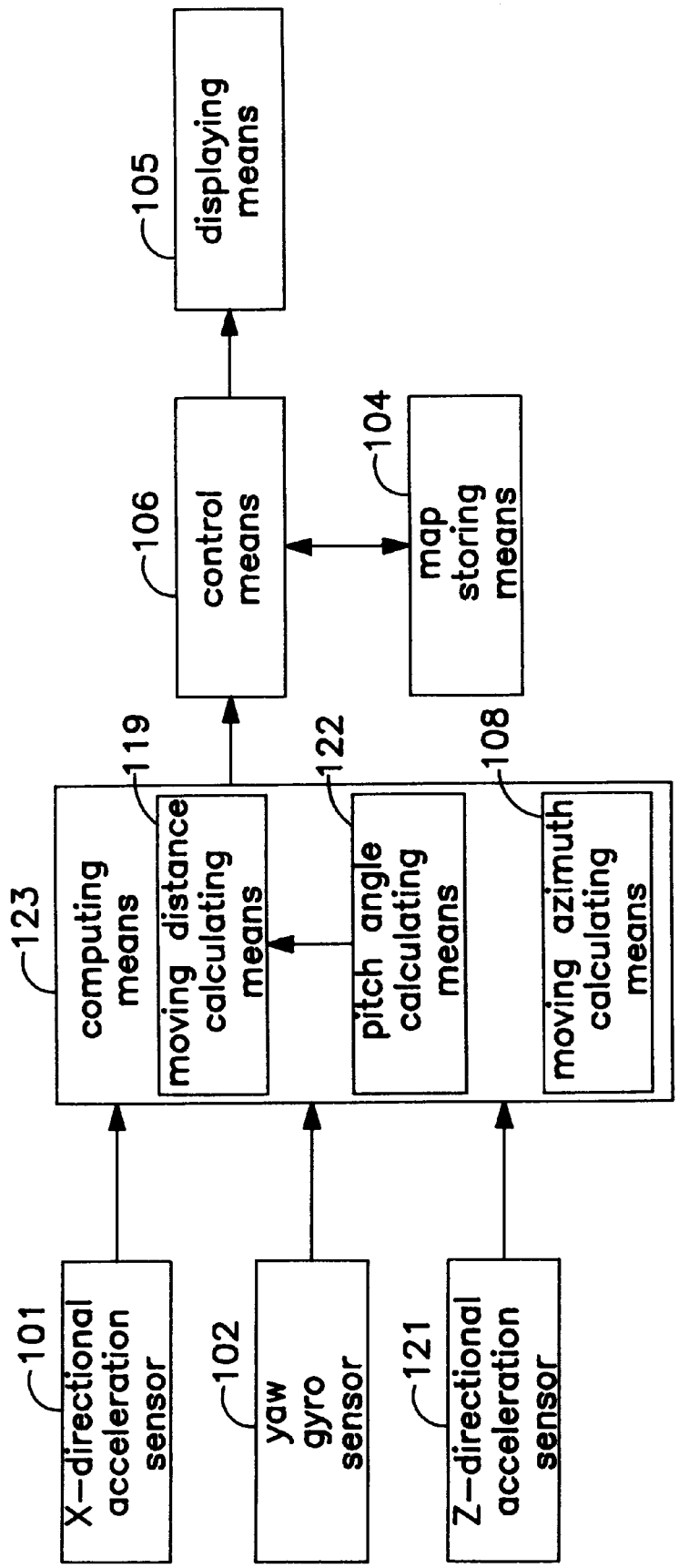
FIG. 12 is a block diagram of a navigation apparatus using an X-directional acceleration sensor, a yaw angular velocity sensor and a Z-directional acceleration sensor in accordance with the third exemplary embodiment of the present invention.

FIG. 12 is a block diagram of a navigation apparatus using an X-direction acceleration sensor, a yaw angular velocity sensor and a Z-directional acceleration sensor in accordance with the third exemplary embodiment of the present invention. The block 121 is a Z-directional acceleration sensor to detect Z-directional acceleration of vehicle 100. The block 122 is a pitch angle calculating means to calculate a pitch angle of vehicle 100 from the output data of Z-directional acceleration sensor 121. The block 123 is computing means to calculate the location of vehicle 100 from the output data of moving distance calculating means 119 and moving azimuth calculating means 108. The blocks having similar functions to those in the first exemplary embodiment are numbered with the same numbers.

Figure 13:
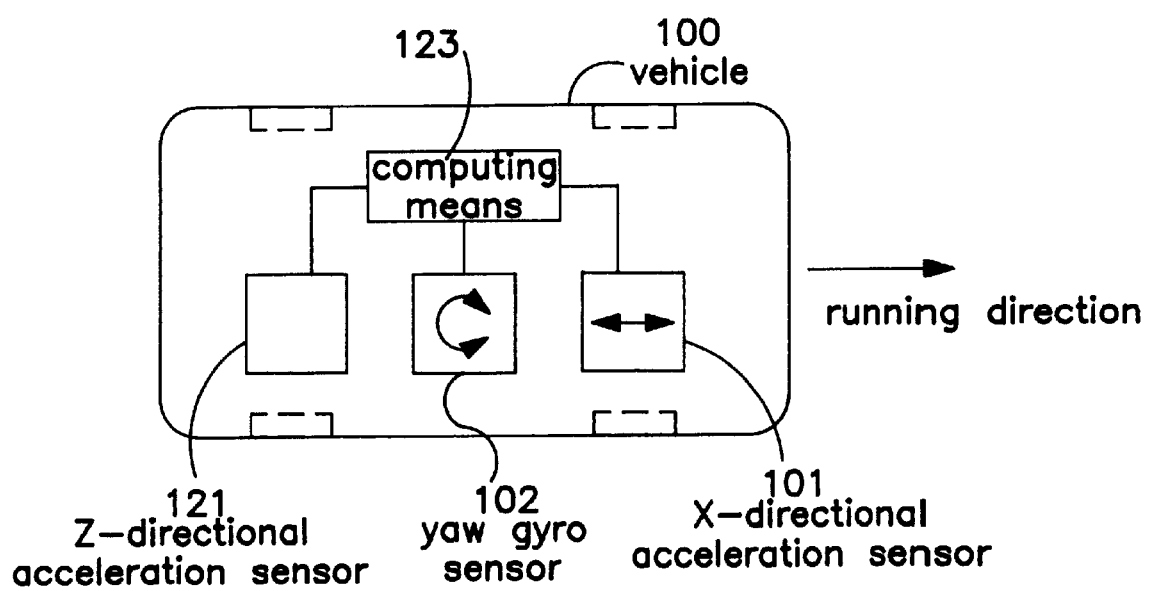
FIG. 13 is a schematic representation of a navigation apparatus shown in FIG. 12 mounted on a vehicle in accordance with the third exemplary embodiment of the present invention. (top plan view)
Figure 14:
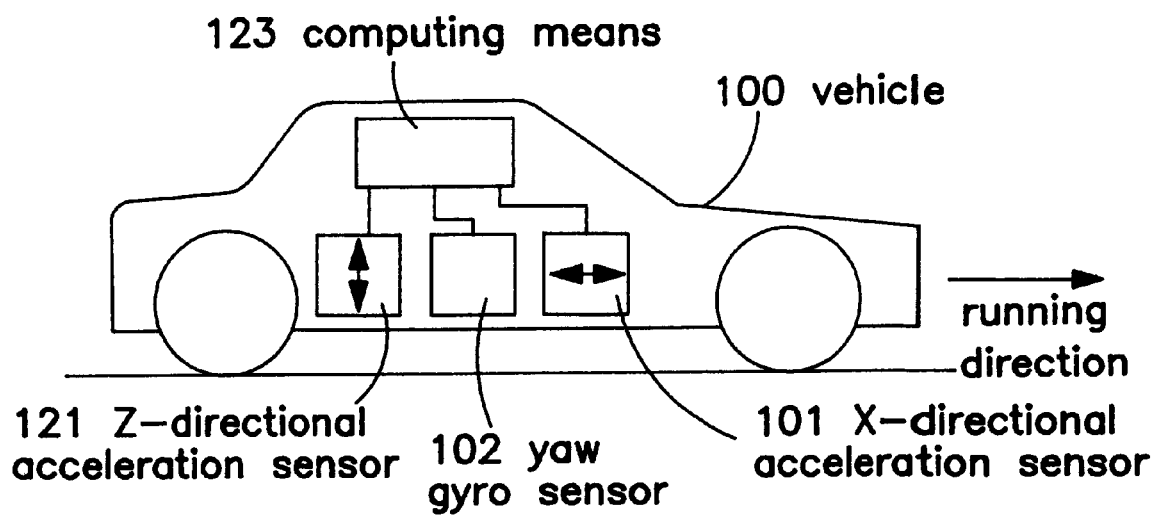
FIG. 14 is a schematic representation of a navigation apparatus shown in FIG. 12 mounted on a vehicle in accordance with the third exemplary embodiment of the present invention. (side view)

FIGS. 13 and 14 are schematic representations of a navigation apparatus shown in FIG. 12 mounted on a vehicle in accordance with the third exemplary embodiment of the present invention and FIG. 13 is its top plan view and FIG. 14 is its side view. X-directional acceleration sensor 101, yaw angle gyro sensor 102 and Z-directional acceleration sensor 121 are attached to vehicle 100 so as to be able to detect a running direction acceleration (X-axis direction in FIG. 3), a yaw angular velocity (around Z-axis in FIG. 3) and a perpendicular acceleration (Z-axis direction in FIG. 3), respectively.

Figure 15:
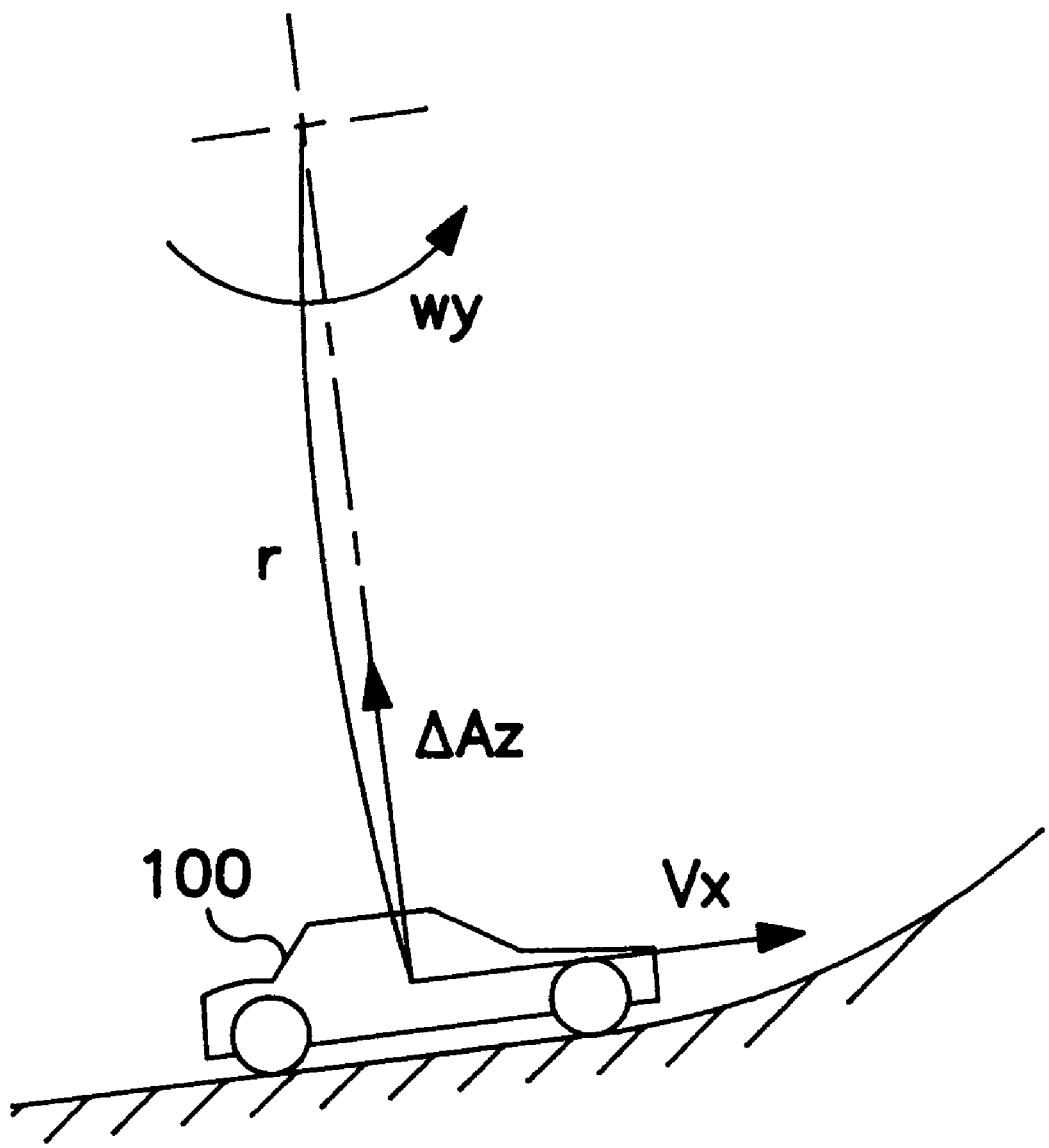
FIG. 15 illustrates a running vehicle in accordance with the third exemplary embodiment of the present invention. (side view)

Pitch angle $\theta_{zn}$ of vehicle 100 is obtained at pitch angle calculating means 122 as follows. FIG. 15 illustrates a running vehicle in accordance with the third exemplary embodiment of the present invention. Considering vehicle 100 is running on a slope road which slope is gradually increasing, the relationship about a centrifugal force of vehicle 100 is expressed by eq. 17.

$$\omega_{yn} = \Delta A_{zn}/V_{xn-1} \qquad (\text{eq.17})$$

Obtaining angular velocity $\omega_{yn}$ from eq. 17, the increment $\Delta\theta_{yn}$ of pitch angle $\theta_{yn}$ for time $\Delta t$ can be calculated by eq. 18.

$$\Delta\theta_{yn} = \omega_{yn} * \Delta t \quad\quad (eq.18)$$

Thus, the increment of pitch angle $\Delta\theta_{yn}$ of vehicle 100 at time n can be calculated and the pitch angle $\theta_{yn}$ can successively be calculated by adding the increment calculated by eq.18 to the pitch angle $\theta_{yn-1}$ calculated at the last instant.

Obtaining pitch angle $\theta_{yn}$ from the output data of Z-directional acceleration sensor 121 at pitch angle calculating means 122, moving distance calculating means 119 compensates acceleration $A_{xn}$ detected by X-directional acceleration sensor 101 by eq. 13 and calculates the actual acceleration axn of vehicle 100.

Moving distance calculating means 119 calculates moving distance $\Delta$Dn of vehicle 100 from eqs. 5 and 6. Moving azimuth calculating means 108 calculates moving azimuth $\theta_{zn}$ from the output data of yaw angle gyro sensor 102, like in the first exemplary embodiment.

Obtaining moving distance $\Delta D_n$ and moving azimuth $\theta_{zn}$ at time n from moving distance calculating means 119 and moving azimuth calculating means 108, respectively, computing means 123 calculates the location $(x_n, y_n)$ of vehicle 100 at time n from the initial location $(x_0, y_0)$ by accumulative calculations expressed by eqs. 8 and 9, as shown in FIG. 27.

Thus, in the third exemplary embodiment, it comes to be able to calculate a pitch angle of vehicle 100 at any time by adding pitch angle gyro sensor 117 or Z-directional acceleration sensor 121 and it is possible to calculate an accurate moving distance of vehicle 100 according to small variations of road slope.

It is obvious that a moving azimuth of vehicle 100 can be calculated using Y-directional acceleration sensor 110 (FIG. 4) inatead of using yaw angle gyro sensor 102 shown in FIGS. 9 and 12.

Particularly, because the accelerations in three directions are detected by X-directional acceleration sensor 101, Y-directional acceleration sensor 110 and Z-directional acceleration sensor 117 by using Y-directional acceleration sensor 110 instead of yaw angle gyro sensor 102, if these three acceleration sensors 101, 110 and 117 are replaced by one semiconductor acceleration sensor (IC) made of semiconductor micro machining, it is possible to make the apparatus cheap and small.

Fourth Exemplary Embodiment

Figure 16:
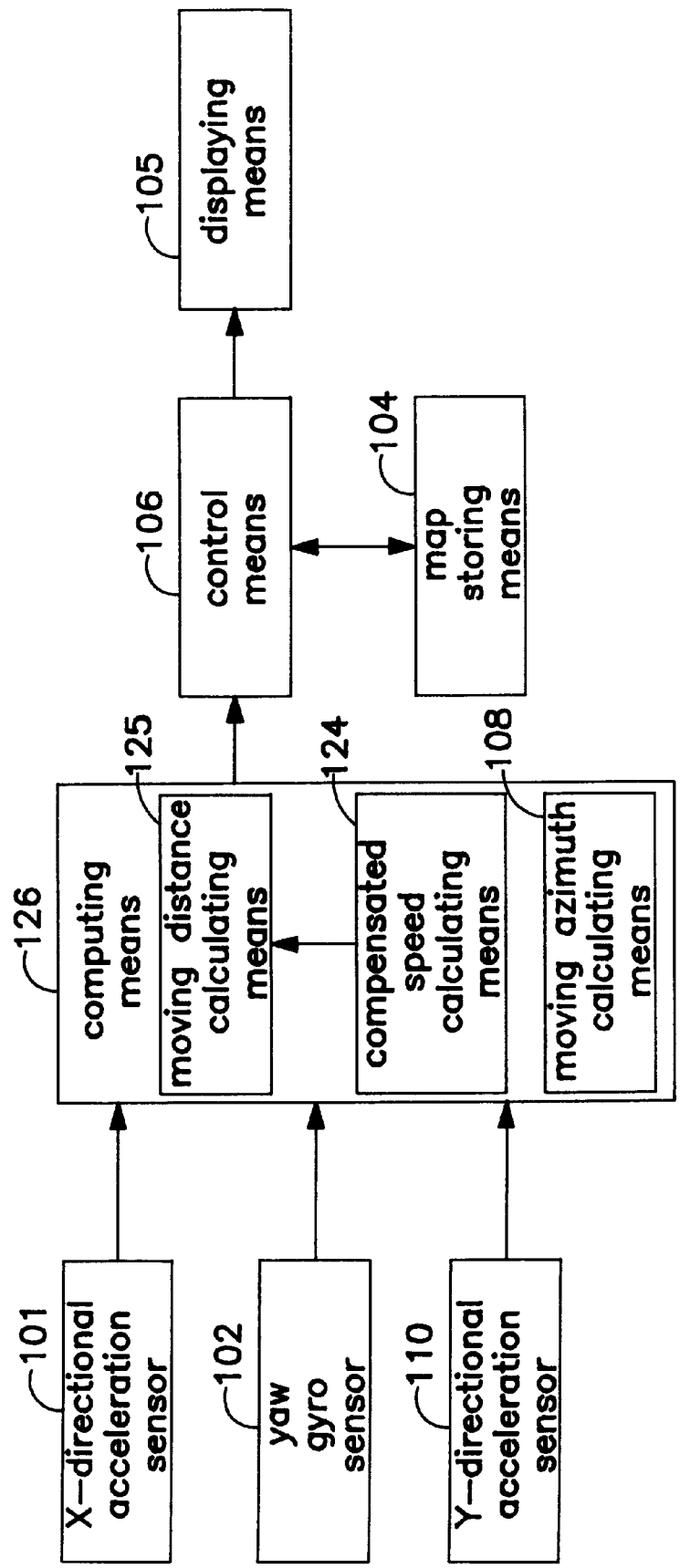
FIG. 16 is a block diagram of a navigation apparatus using an X-directional acceleration sensor, a yaw angular velocity sensor and a Y-directional acceleration sensor in accordance with a fourth exemplary embodiment of the present invention.

The fourth exemplary embodiment of the present invention is explained below, referring to drawings. FIG. 16 is a block diagram of a navigation apparatus using an X-direction acceleration sensor, a yaw angular velocity sensor and a Y-direction acceleration sensor in accordance with a fourth exemplary embodiment of the present invention. The block 124 is a compensated speed calculating means for calculating a compensated speed. The block 125 is moving distance calculating means for calculating a moving distance of vehicle 100 using a compensated speed calculated at compensated speed calculating means 124. The block 126 is computing means for calculating a location of vehicle 100 from the output data of moving distance calculting means 125 and moving azimuth calculting means 108. The blocks having similar functions to those in the first exemplary embodiment are numbered with the same reference numbers.

Figure 17:
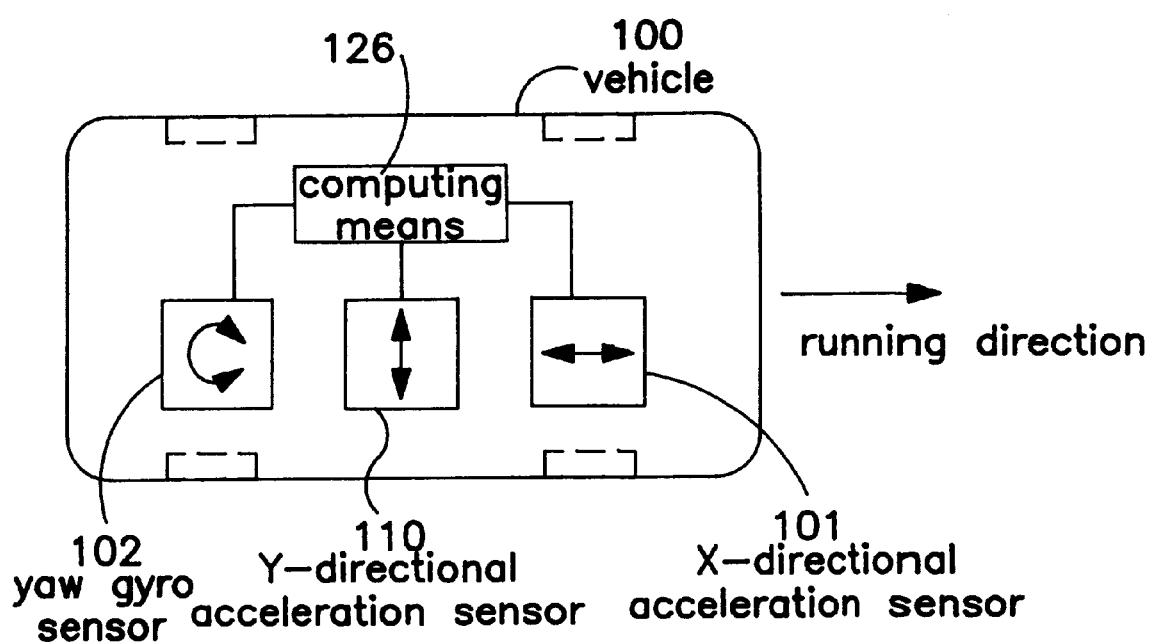
FIG. 17 is a schematic representation of a navigation apparatus shown in FIG. 16 mounted on a vehicle in accordance with the fourth exemplary embodiment of the present invention. (top plan view)

FIG. 17 is a schematic representation (top plan view) of a navigation apparatus shown in FIG. 16 mounted in a vehicle in accordance with the fourth exemplary embodiment of the present invention. As shown in FIG. 17, X-directional acceleration sensor 101, yaw angle gyro sensor 102 and Y-directional acceleration sensor 110 are attached to vehicle 100 so as to be able to detect an acceleration in a running direction of vehicle 100 (X direction in FIG. 3), an angular velocity in the yaw direction of vehicle 100 (around Z axis in FIG. 3) and an acceleration in a prtpendicular direction with the running direction on the horizontal plane (Y direction in FIG. 3), respectively.

Although the moving distance of vehicle 100 is calculated from the output data of X-directional acceleration sensor 101 is explained in the first exemplary embodiment, when the output of acceleration sensor 101 has some error due to pitching and temperature variation of vehicle 100, the moving distance calculated from the output data of acceleration sensor 101 also contains error. Because the location of vehicle 100 is calculated by accumulative calculation, the errors are also accumulated. Therefore, even if they are very small errors, the accumulated error becomes as large as not negligible for a long running distance. This is a problem.

Canceling the error included, the X-directional acceleration detected by X-directional acceleration sensor 101 is explained below.

Compensated speed is calculated as follows at compensated speed calculating means 124. There is a relationship expressed by eq. 19 between the centrifugal force during vehicle 100 is doing a rotation motion around the Z axis, that is the acceleration $a_{yn}$ detected by Y-directional acceleration sensor 110 and the angular velocity $\omega_{zn}$ detected by yaw angle gyro sensor 102, where m is the mass of vehicle 100 and r is the radius of rotation of vehicle 100 at time n.

$$m * r_n * \omega_{zn}^2 = m * a_{yn} \quad\quad (eq.19)$$

There is a relationship expressed by eq. 20 between an angular velocity $\omega_{zn}$ detected by yaw gyro sensor 102 and a peripheral velocity (compensated speed, hereafter) $V_n$ at time n.

$$V_n = r_n * \omega_{zn} \quad\quad (eq.20)$$

Eq. 21 is derived from eqs. 19 and 20.

$$V_n = a_{rn}/\omega_{zn} \quad\quad (eq.21)$$

Compensated speed calculating means 124 calculates compensated speed $V_n$ from the output data of X-directional acceleration means 101 and yaw gyro sensor 102 by eq. 21.

Obtaining X-directional acceleration $a_{xn}$ at time n from X-directional acceleration means 101, moving distance calculating means 125 calculates velocity $V_{xn}$ of vehicle 100 at time n by eq. 5, like in the first exemplary embodiment. In the case in which vehicle 100 rotates around Z axis and compensated speed $V_n$ is calculated at compensated speed calculating means 124, moving distance $\Delta D_n$ of vehicle 100 is calculated using compensated speed $V_n$ instead of X-directional velocity $V_{xn}$ in eq. 6.

Moving azimuth calculating means 108 calculates moving azimuth $\theta_{zn}$ at time n from the output data of yaw gyro sensor 102, like in the first exemplary embodiment. It is disclosed in the explanation about the second exemplary embodiment that moving azimuth $\theta_{zn}$ may be obtained from the output data of Y-directional acceleration sensor 110.

Because the difference between velocity $v_{xn}$ and compensated speed $V_n$ is the error caused by the error at the second member of the right side of eq. 5, a compensation coefficient expressing a relation between velocity $v_{xn}$ and compensated speed $V_n$ is obtained and the acceleration $a_{xn}$ obtained from X-directional acceleration sensor 101 may be compensated by the compensation coefficient, not replacing velocity $v_{xn}$ to compensated speed $V_n$.

Obtaining moving distance $\Delta D_n$ and moving azimuth $\Delta\theta_{zn}$ at time n from moving distance calculating means 125 and moving distance calculating means 108, respectively, computing means 126 calculates the location $(x_n, y_n)$ of the vehicle at time n executing an accumulative calculation from the initial location $(x_0, y_0)$ by eqs. 8 and 9, as shown in FIG. 27.

Thus, in the fourth exemplary embodiment of the present invention, when vehicle 100 rotates around the Z axis, the compensated speed is obtained from the output data of yaw gyro sensor 102 and Y-directional acceleration sensor 110 and an accurate location of vehicle 100 can be obtained by calculating the moving distance from the compensated speed obtained above and canceling the error included in the moving distance accumulated.

As described in the prior art, the moving distance can be calculated from the signal corresponding to the number of rotations of the wheel which is detectable from vehicle 100 instead of the output data from X-directional acceleration sensor 101.

Fifth Exemplary Embodiment

Figure 18:
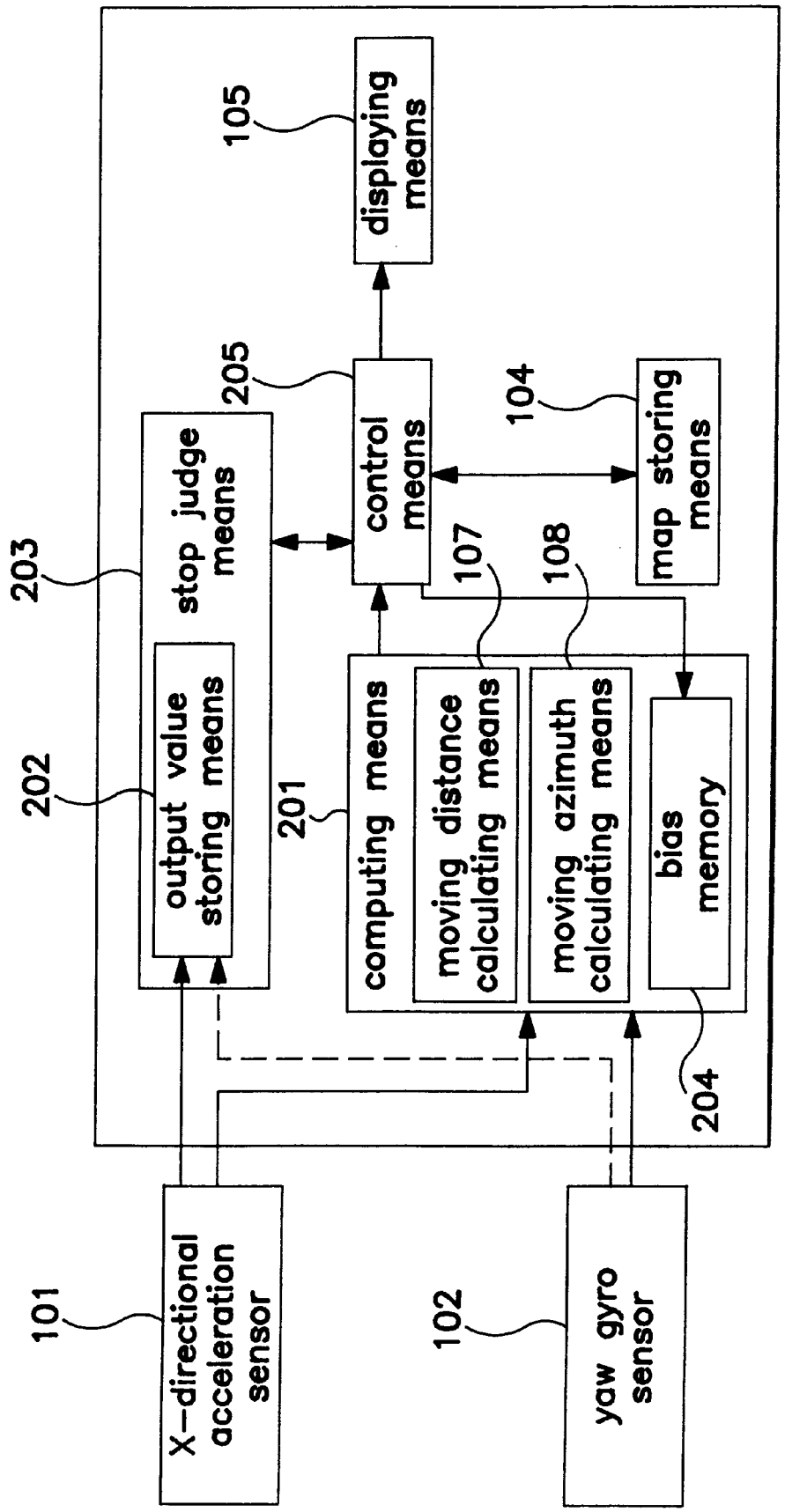
FIG. 18 is a block diagram of a navigation apparatus using an X-directional acceleration sensor and a yaw angular velocity sensor in accordance with a fifth exemplary embodiment of the present invention.

The fifth exemplary embodiment of the present invention is explained below, referring to drawings. FIG. 18 is a block diagram of a navigation apparatus using an X-direction acceleration sensor and a yaw angular velocity sensor in accordance with a fifth exemplary embodiment of the present invention. The block 204 is a bias memory for storing bias values (output values when the detected acceleration or the angular velocity is zero) of X-directional acceleration sensor 101 and yaw gyro sensor 102. The block 201 is computing means for transforming the output data from X-directional acceleration sensor 101 and yaw gyro sensor 102 into an acceleration and an angular velocity according to the bias values stored in bias memory and calculating the location of vehicle 100 from the calculated result of moving distance calculating means 107 and moving azimuth calculating means 108. The block 202 is output value storing means for temporarily storing the output data from X-directional acceleration sensor 101. The block 203 is stop judge means for judging a stopping state of vehicle 100 according to the output data from X-directional acceleration sensor 101 stored in output value storing means 202. The block 205 is control means for controlling rewrite processing of the bias value at bias memory 204 from the judge result of stop judge means 203.

As well as the first exemplary embodiment, obtaining the location of vehicle 100 from computing means 201, control means 205 reads map data from map storing means 104 and displays it on a display means 105. The blocks having similar functions to those in the first exemplary embodiment are numbered with the same reference numbers.

Figure 19:
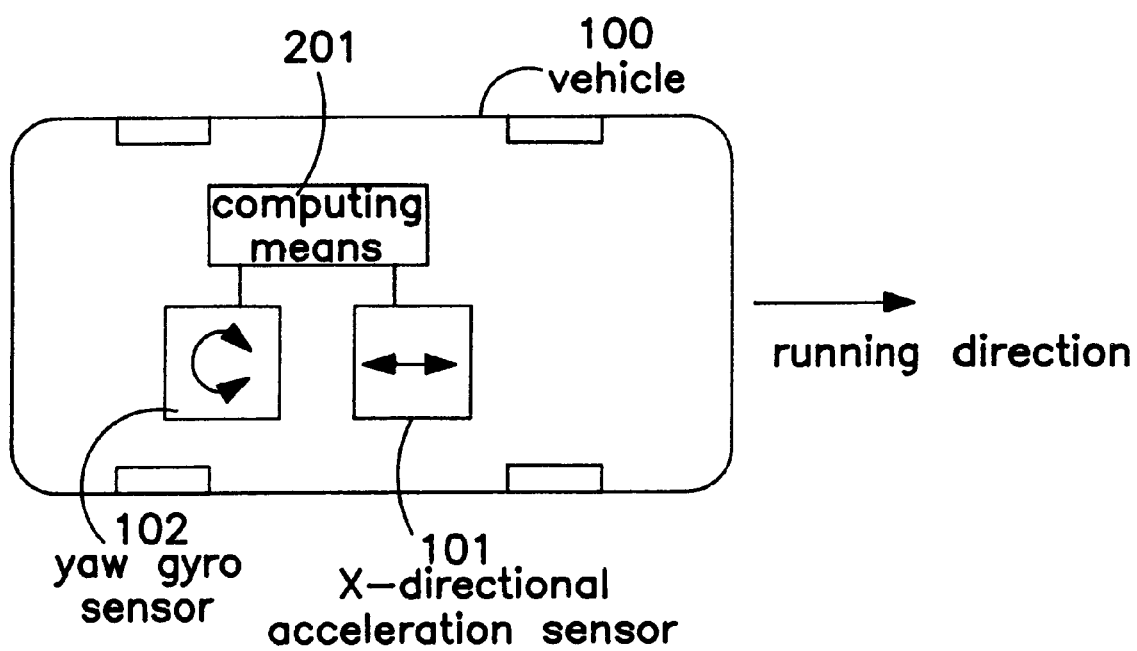
FIG. 19 is a schematic representation of a navigation apparatus shown in FIG. 18 mounted on a vehicle in accordance with the fifth exemplary embodiment of the present invention. (top plan view)

FIG. 19 is a schematic representation of a navigation apparatus shown in FIG. 18 mounted on a vehicle in accordance with the fifth exemplary embodiment of the present invention. An X-directional acceleration sensor 101 and a yaw gyro sensor 102 are attached to a vehicle 100 so as to be able to detect an acceleration in the running direction of vehicle 100 (X-direction on FIG. 3) and an angular velocity in a yaw motion direction of vehicle 100 (around Z-axis in FIG. 3), respectively.

Figure 20:
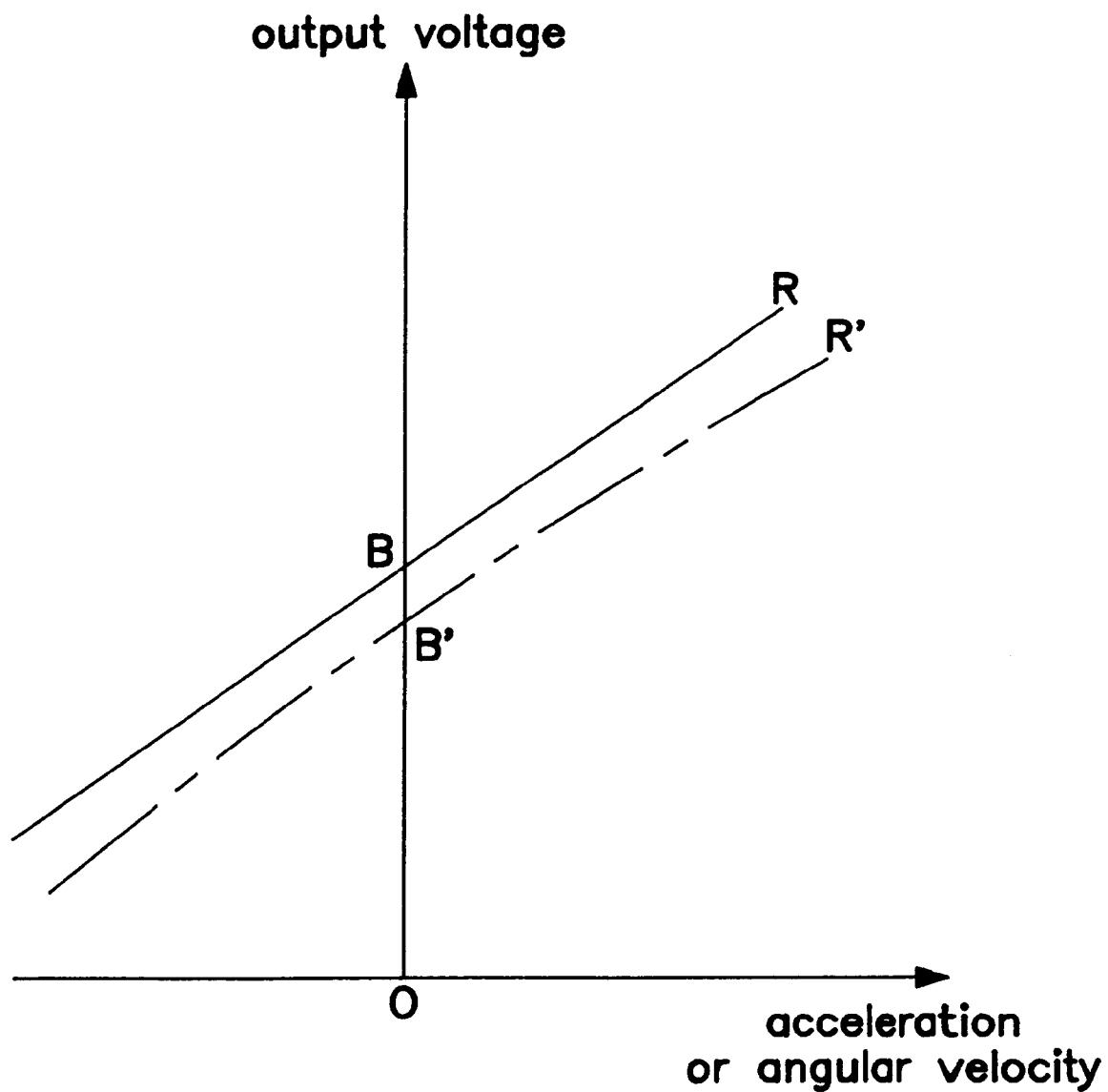
FIG. 20 shows output characteristics of an acceleration sensor or a gyro sensor.

FIG. 20 shows output characteristics of an acceleration sensor or a gyro sensor. X-directional acceleration sensor 101 and yaw gyro sensor 102 are sensors outputting voltages proportional to the detected acceleration and angular velocity, respectively, as shown in FIG. 20. Because the voltage output is always positive polarity, a processing is necessary to subtract a certain bias from the detected output for making the output positive and negative.

The bias value has a characteristic which irregularly varies due to external factors such as time elapse and temperature drift. For example, in FIG. 20, let us consider the output characteristic is a solid line R and it changes to another output characteristic shown in a broken line R' due to an external factor.

Such an error of bias value becomes errors of calculated moving distance and moving azimuth and even if they are small, they are accumulated by accumulative calculation and gradually comes as large as not negligible. Especially, in spite of vehicle 100 is not in a stopping state, acceleration data and angular velocity data which are not zero due to error are obtained and the vehicle location moves on the map. This is a problem.

Therefore, in order to detect an accurate vehicle location, it is necessary to remove errors due to bias drift but an acceleration sensor or a gyro sensor can not detect that the acceleration or the angular velocity is zero due to their characteristics. Accordingly, a state the acceleration or the angular velocity is zero, that is the vehicle stopping state is judged and the output data of acceleration sensor 101 or gyro sensor 102 is renewed as a bias value.

The moving distance is calculated at moving distance calculating means 107 on the basis of the output data of X-directional acceleration sensor 101. The moving azimuth is calculated at moving azimuth calculating means 108 on the basis of the output data of yaw gyro sensor 102. The processing to obtain the vehicle location at computing means 201 on the basis of these moving distance and moving azimuth is similar to that of the first exemplary embodiment and its explanation is omitted.

Figure 21:
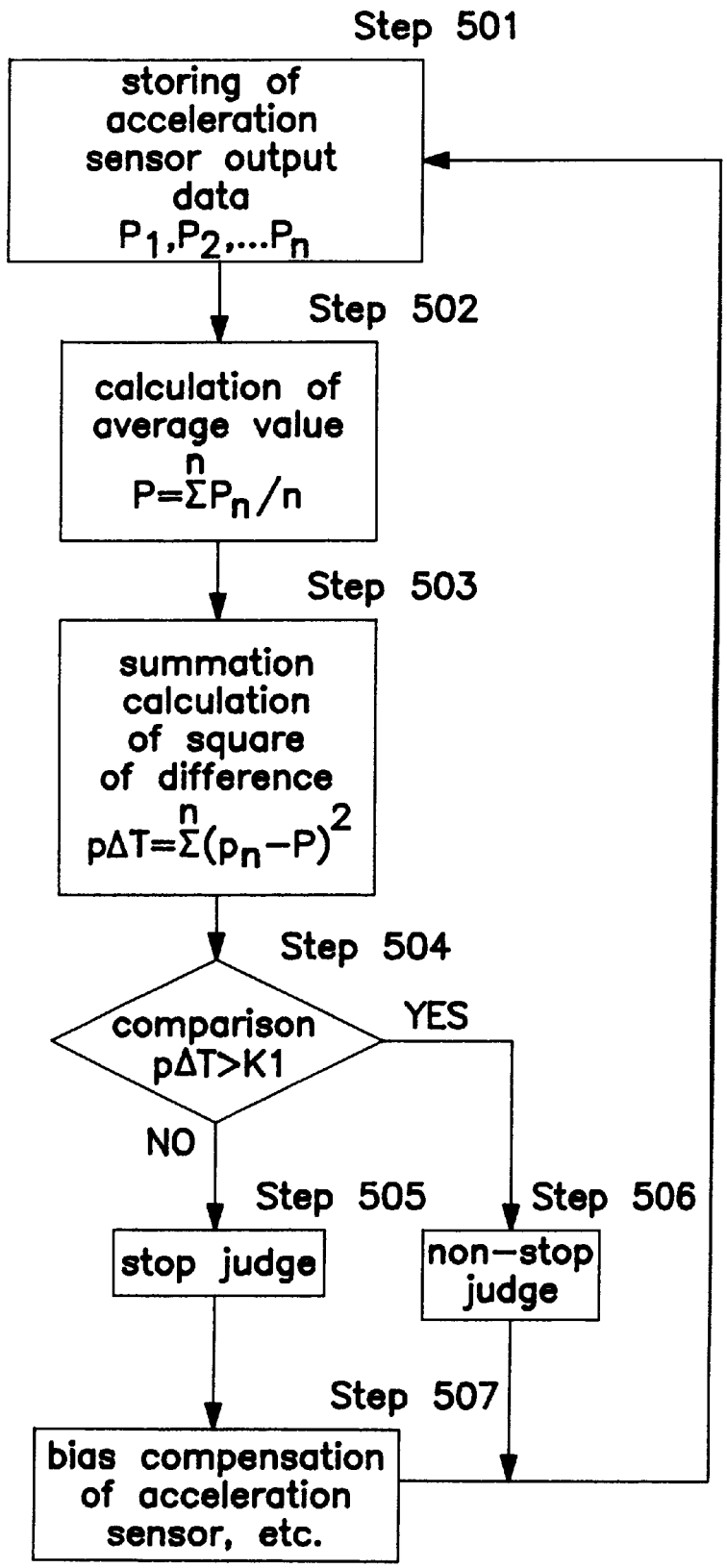
FIG. 21 is a flow chart of stop judge means in accordance with the fifth exemplary embodiment of the present invention. (a process to judge a stopping state of vehicle 100 from the output data variation of X-directional acceleration sensor 101).

FIG. 21 is a flow chart of stop judge means in accordance with the fifth exemplary embodiment of the present invention and explains a processing to judge a stopping state of vehicle 100 from the output data variation of the X-direction acceleration sensor 101.

Step 501: The output data from X-directional acceleration sensor 101 is temporarily stored in output value storing means 202 at every designated time $\Delta T$.

Step 502: Reaching the designated time $\Delta T$, stop judge means 203 calculates a mean value P of a plurality of output data $p_n$ of X-directional acceleration sensor 101 stored in output value storing means 202.

$$P = \sum^{n} p_n / n \qquad \text{(eq. 22)}$$

Step 503: A difference between the individual output data $p_n$ of X-directional acceleration sensor 101 stored in output value storing means 202 during designated time $\Delta T$ and the mean value P calculated by eq. 22 is calculated and its square is calculated and further a summation p∆T of individually calculated values is calculated.

$$p*\Delta T = \sum^{n}(p_n - P)^2 \quad \text{(eq. 23)}$$

Step 504: Stop judge means 203 compares p∆T calculated by eq. 23 and a predetermined threshold value k1.

Step 505: If p∆T<=k1, vehicle 100 is judged to be in a stopping state.

Step 506: If p∆T>k1, vehicle 100 is judged to be in a not-stopping state.

That is, if the distributed processing value of the output value of directional acceleration sensor 101 at a designated time ∆T is smaller than a threshold value k1, vehicle 100 is judged to be in a stopping state.

As a reference to determine the threshold value k1, it is preferable to set on a boundary between the state in which vehicle 100 stops and the other state in which vehicle 100 is running with a constant speed. Comparing between a stopping state and a running state with a constant speed, the output data of X-directional acceleration sensor 101 at a stopping state has almost no variation and nearly equal to the bias value. The output data at a running state with a constant speed does not become nearly equal to the bias value because a small drift of,the vehicle speed is detected. The output data variation of X-directional acceleration sensor 101 at a running state with a constant speed is detected with a larger value than the output data variation at a stopping state. Therefore, it is possible to accurately judge the stopping state of vehicle 100 by setting a threshold value k1 at the boundary.

It is possible to judge a stopping state of vehicle 100 from the output data of yaw gyro sensor 102 instead of the output data of X-directional acceleration sensor 101 and it is explained below.

Figure 22:
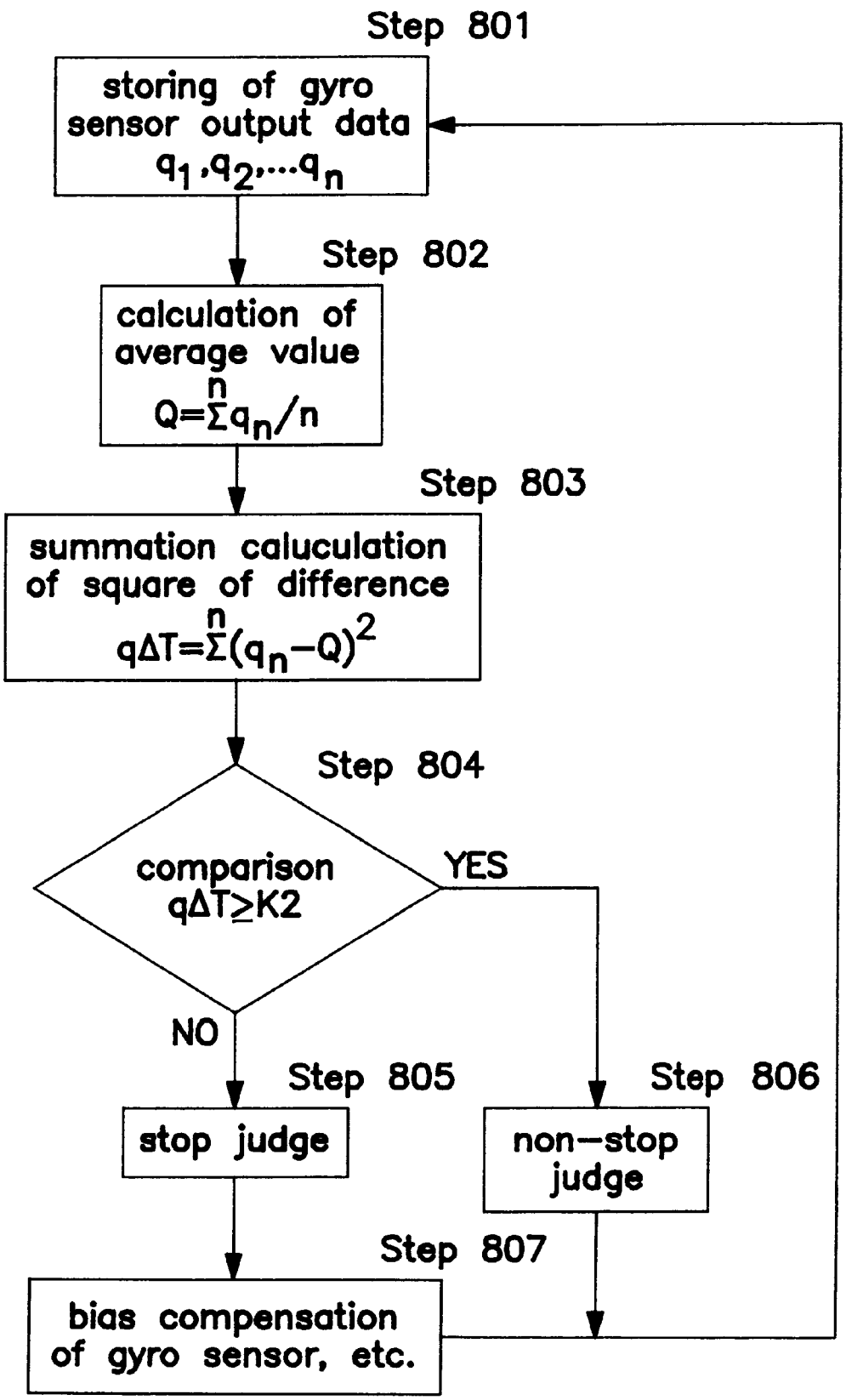
FIG. 22 is a flow chart of stop judge means in accordance with the fifth exemplary embodiment of the present invention. (a process to judge a stopping state of vehicle 100 from the output data variation of yaw angular velocity sensor 102).

FIG. 22 is a flow chart of stop judge means in accordance with the fifth exemplary embodiment of the present invention and a process to judge a stopping state of vehicle 100 from a variation of the output data of the yaw angular velocity sensor 102. Output value storing means 202 shown in FIG. 18 stores the output data of jaw gyro sensor 102.

Step 801: An output data $q_n$ of yaw gyro sensor 102 is stored in output value storing means 202 at every designated time ∆T.

Step 802: A mean value of the output values q of yaw gyro sensor 102 at a designated time ∆T is calculated according to a command from control means 205.

$$Q = \sum^{n} q_n / n \quad \text{(eq. 24)}$$

Step 803: A difference between the individual output data $q_n$ of yaw gyro sensor 102 stored in output value storing means 202 during a designated time ∆T and the mean value Q calculated by eq. 24 is calculated and its square value is calculated and further a summation q∆T of individually calculated values is calculated.

$$q*\Delta T = \sum^{n}(q_n - Q)^2 \quad \text{(eq. 25)}$$

Step 804: The value q T calculated by eq. 25 and a predetermined threshold value k2 are compared.

Step 805: If q∆T<=k2, vehicle 100 is judged to be in a stopping state.

Step 806: If q∆T>k2, vehicle 100 is judged to be in a not-stopping state.

That is, if the distributed processing value of the output value of yaw gyro sensor 102 at a designated time ∆T is smaller than a threshold value k2, vehicle 100 is judged to be in a stopping state.

As a reference to determine the threshold value k2, it is preferable to set on a boundary between the state in which vehicle 100 stops and the other state in which vehicle 100 is running straightly. Comparing between a stopping state and a straightly running state, the output data of yaw gyro sensor 102 at a stopping state has almost no variation and nearly equal to the bias value. In the case in which vehicle 100 is straightly running, vehicle 100 detects small meandering and the output data of yaw gyro sensor 102 does not become nearly equal to the bias value. The output data variation of yaw gyro sensor 102 at straightly running state is detected with a larger value than the output data variation at a stopping state. Therefore, it is possible to accurately judge the stopping state of vehicle 100 by setting a threshold value k1 on the boundary.

Thus, when stop judge means 203 judges the stooping state of vehicle 100 on the basis of the output variation of X-directional acceleration sensor 101 or yaw gyro sensor 102, control means 205 makes bias memory 204 to store the output values of X-directional acceleration sensor 101 and yaw gyro sensor 102 as each bias value and thus the bias values are renewed.

As described above, in the fifth exemplary embodiment of the present invention, it is possible to judge a stopping state of vehicle 100 from the output data variation of X-directional acceleration sensor 101 or yaw gyro sensor 102. By renewing the bias value of X-directional acceleration sensor 101 and yaw gyro sensor 102 at a stopping state of vehicle 100, it can be prevented that the output errors of X-directional acceleration sensor 101 and yaw gyro sensor 102 are accumulated and a navigation apparatus can be realized which can obtain the accurate location of vehicle 100.

It is obvious that stop judge means 203 is applicable to judge a stopping state in the second exemplary embodiment of the present invention.

Figure 23:
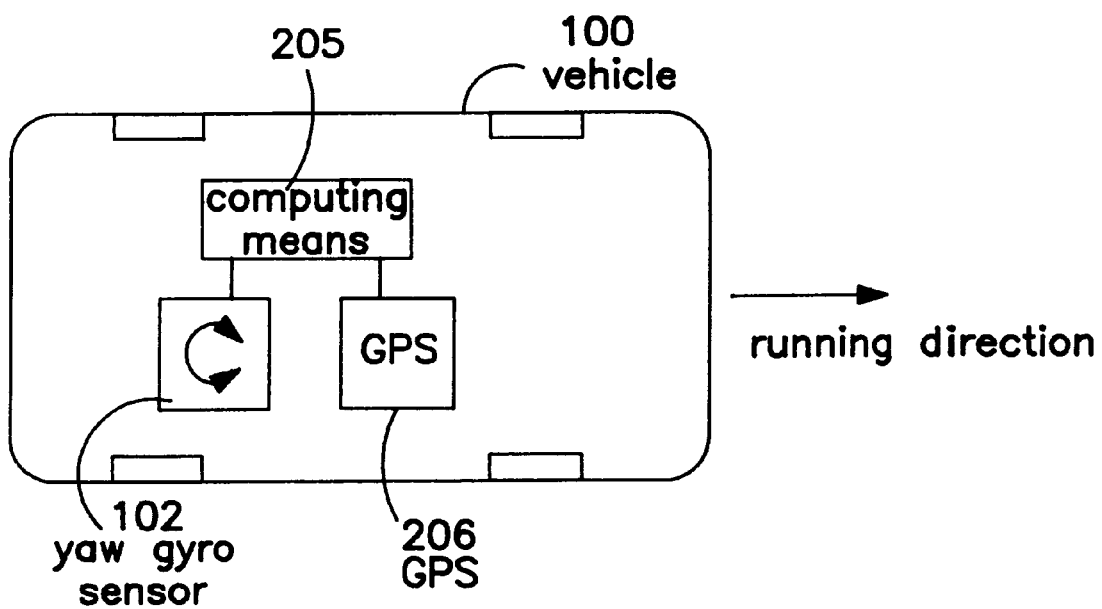
FIG. 23 is a schematic representation of a navigation apparatus using a yaw angular velocity sensor and a GPS mounted in a vehicle in accordance with the fifth exemplary embodiment of the present invention. (top plan view)
Figure 24:
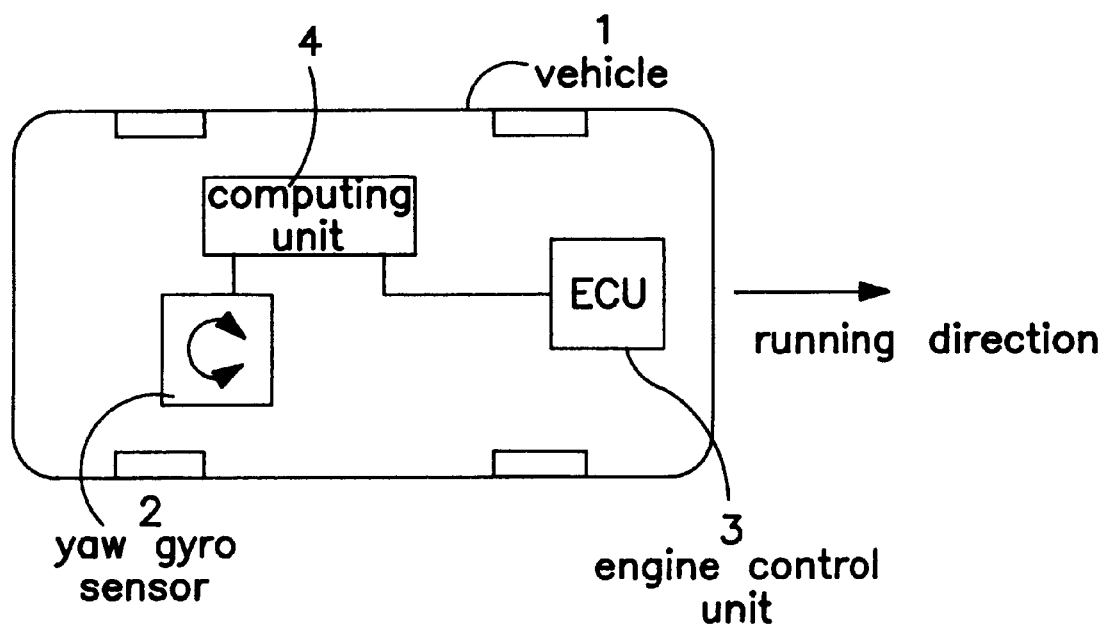
FIG. 24 is a schematic representation of a navigation apparatus in accordance with the prior art. (top plan view)
Figure 25:
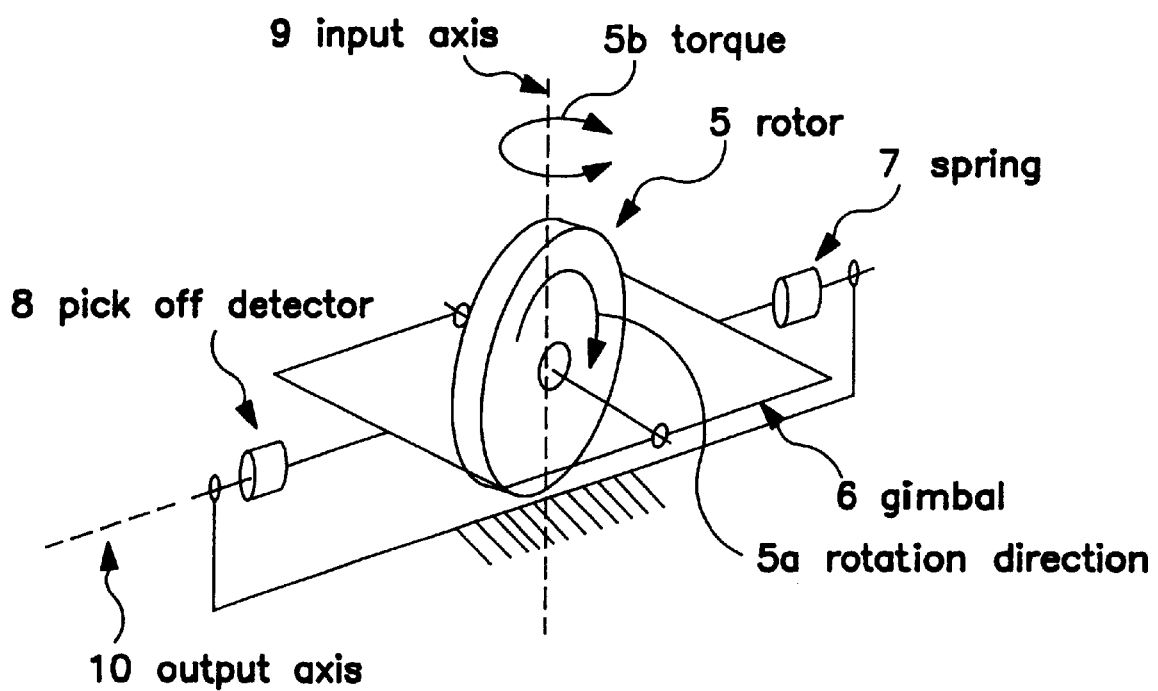
FIG. 25 illustrates a construction of a top type rate gyro sensor.
Figure 26:
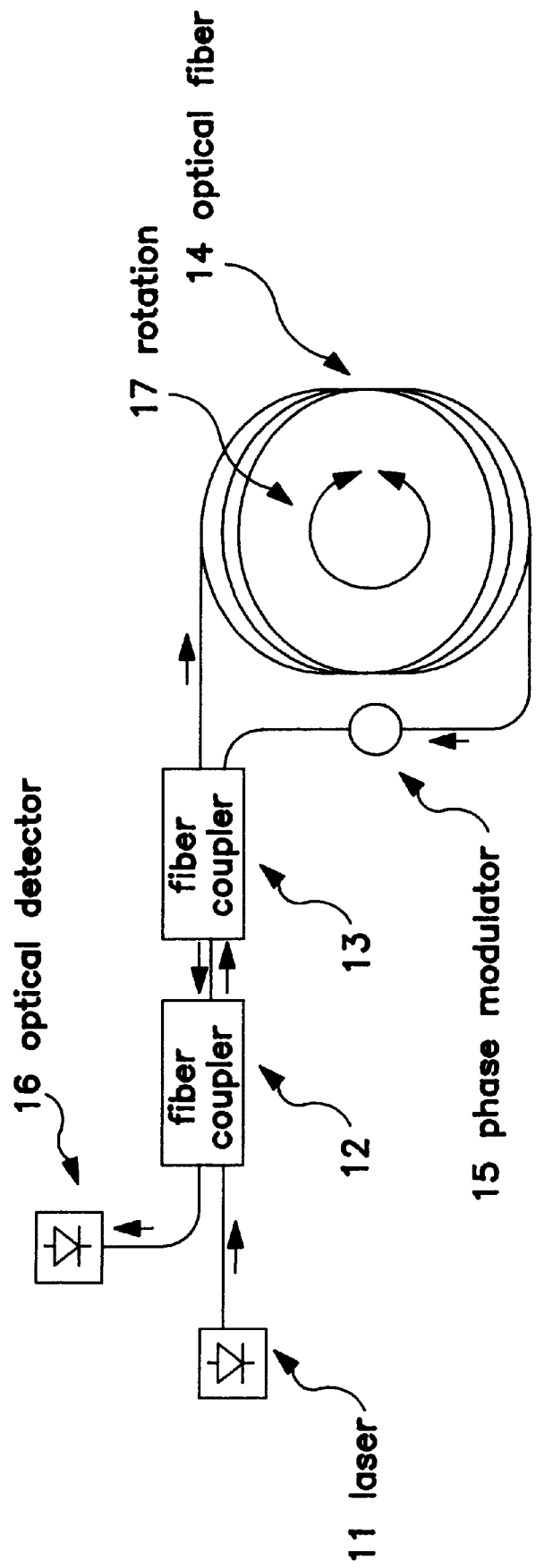
FIG. 26 illustrates a construction of an optical fiber gyro sensor.

As a further example using the fifth exemplary embodiment, the following case is considered. FIG. 23 is a schematic representation of a navigation apparatus using a yaw angular velocity sensor and a GPS mounted on a vehicle in accordance with the fifth exemplary embodiment of the present invention. GPS (Grobal Positioning System) is used for obtaining the location of vehicle 100. As shown in FIG. 23, because in GPS measurement, the location of vehicle 100 is obtained by receiving waves simultaneously from a plurality of GPS satellites, location measuring error always occurs due to receiving circumference. Even if in the case in which vehicle 100 is in a stopping state, vehicle 100 moves or fluctuates on the map due to location measuring error. A gyro sensor is provided to prevent it and a stopping state of vehicle 100 is judged from the output variation of the gyro sensor and when it is in a stopping state, it is possible to control compulsively not to move the location of vehicle 100 on the map data by control means 207.

It is obvious from the first exemplary embodiment that a Y-directional acceleration sensor 110 can be used instead of yaw gyro sensor 102 to obtain a moving azimuth of vehicle 100 and it is possible to judge the stopping state of vehicle 100 from the output variation of Y-directional acceleration sensor 110. Therefore, this method is applicable to any other exemplary embodiments than the fifth exemplary embodiment.

As described in the prior art, it is possible to judge a stopping state of vehicle 100 from the output variation of yaw gyro sensor 102 and to renew the bias value of yaw gyro sensor 102 even when a moving distance is obtained from a signal corresponding to the number of wheel rotations detectable from vehicle 100.

The invention may be embodied in other specific form, without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation apparatus comprising:

X-directional acceleration detecting means for detecting an acceleration in a vehicle running direction;

yaw angular velocity detecting means for detecting an angular velocity of the vehicle in a yaw motion;

moving distance calculating means for calculating a vehicle moving distance based on only output data of said X-directional acceleration detecting means;

moving azimuth calculating means for calculating a vehicle moving azimuth from output data of said yaw angular velocity detecting means;

computing means for calculating a vehicle location by successively accumulating vehicle moving distance data and vehicle moving azimuth data calculated by said moving distance calculating means and said moving azimuth calculating means, respectively, on the vehicle location data obtained previously; and stop judge means for judging a vehicle stopping state based on a variation of the output data of said X-directional acceleration detecting means.

2. A navigation apparatus as recited in claim 1, wherein said stop judge means judges a vehicle stopping state by comparing the output data of said X-directional acceleration detecting means with a designated threshold value.

3. A navigation apparatus as recited in claim 1, wherein said stop judge means compares a value calculated by statistically processing a plurality of output data detected at said X-directional acceleration detecting means at every designated time with a designated threshold value and judges a vehicle stopping state.

4. A navigation apparatus comprising:

X-directional acceleration detecting means for detecting an acceleration in a vehicle running direction;

yaw angular velocity detecting means for detecting an angular velocity of the vehicle in a yaw motion;

moving distance calculating means for calculating a vehicle moving distance based on only output data of said X-directional acceleration detecting means;

moving azimuth calculating means for calculating a vehicle moving azimuth from output data of said yaw angular velocity detecting means;

computing means for calculating a vehicle location by successively accumulating vehicle moving distance data and vehicle moving azimuth data calculated by said moving distance calculating means and said moving azimuth calculating means, respectively, on the vehicle location data obtained previously;

bias storing means for storing a bias value of at least one of i) said X-directional acceleration detecting means and ii) said yaw angular velocity detecting means;

stop judge means for judging a vehicle stopping state based on a variation of the output data of said X-directional acceleration detecting means; and control means for controlling storage of the output data of at least one of i) said X-directional acceleration detecting means and ii) said yaw angular velocity detecting means in said bias storing means as a bias value, when said stop judge means judges that the vehicle is in a stopping state.

* * * * *